(12) United States Patent
Yang et al.

(10) Patent No.: US 12,301,866 B2
(45) Date of Patent: May 13, 2025

(54) INTRA PREDICTION METHOD AND APPARATUS

(71) Applicant: Huawei Technologies Co., Ltd., Shenzhen (CN)

(72) Inventors: Haitao Yang, Shenzhen (CN); Nan Song, Shenzhen (CN); Xu Chen, Shenzhen (CN); Xiang Ma, Moscow (RU); Huanbang Chen, Shenzhen (CN); Yin Zhao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 92 days.

(21) Appl. No.: 18/191,367

(22) Filed: Mar. 28, 2023

(65) Prior Publication Data

US 2023/0239500 A1  Jul. 27, 2023

Related U.S. Application Data

(63) Continuation of application No. PCT/CN2021/120642, filed on Sep. 26, 2021.

(30) Foreign Application Priority Data

Sep. 28, 2020  (CN) .......................... 202011043931.1

(51) Int. Cl.
*H04N 19/593* (2014.01)
*G06N 3/08* (2023.01)
(Continued)

(52) U.S. Cl.
CPC ............. *H04N 19/593* (2014.11); *G06N 3/08* (2013.01); *H04N 19/11* (2014.11);
(Continued)

(58) Field of Classification Search
CPC .... H04N 19/593; H04N 19/11; H04N 19/136; H04N 19/159; H04N 19/172;
(Continued)

(56) References Cited

U.S. PATENT DOCUMENTS

2020/0236349 A1  7/2020  Zhai et al.
2021/0266565 A1*  8/2021  Zhou .................... H04N 19/124
(Continued)

FOREIGN PATENT DOCUMENTS

WO  2019185808 A1  10/2019
WO  2020188273 A1  9/2020

OTHER PUBLICATIONS

Document: JCTVC-D108, Shiodera, T., et al., "CE6 Subset A: Bidirectional Intra Prediction," Joint Collaborative Team on Video Coding (JCT-VC) of ITU-T SG16 WP3 and ISO/IEC JTC1/SC29/WG11, 4th Meeting: Daegu, KR, Jan. 20-28, 2011, 13 pages.
(Continued)

*Primary Examiner* — Boubacar Abdou Tchoussou
(74) *Attorney, Agent, or Firm* — Conley Rose, P.C.

(57) ABSTRACT

An intra prediction method includes obtaining respective intra prediction modes or texture distributions of P reconstructed picture blocks in a surrounding region of a current block; obtaining, based on the respective intra prediction modes or texture distributions of the P reconstructed picture blocks, Q priori candidate intra prediction modes of the current block and Q probability values; obtaining, based on M probability values corresponding to M priori candidate intra prediction modes, M weighting factors corresponding to the M priori candidate intra prediction modes; separately performing intra prediction based on the M priori candidate intra prediction modes to obtain M predicted values; and obtaining a predicted value of the current block based on a
(Continued)

weighted summation of the M predicted values and the corresponding M weighting factors.

20 Claims, 16 Drawing Sheets

(51) Int. Cl.
| | |
|---|---|
| *H04N 19/11* | (2014.01) |
| *H04N 19/136* | (2014.01) |
| *H04N 19/159* | (2014.01) |
| *H04N 19/172* | (2014.01) |
| *H04N 19/176* | (2014.01) |
| *H04N 19/42* | (2014.01) |

(52) U.S. Cl.
CPC ......... *H04N 19/136* (2014.11); *H04N 19/159* (2014.11); *H04N 19/172* (2014.11); *H04N 19/176* (2014.11); *H04N 19/42* (2014.11)

(58) Field of Classification Search
CPC .... H04N 19/176; H04N 19/42; H04N 19/149; G06N 3/08
See application file for complete search history.

(56) References Cited

U.S. PATENT DOCUMENTS

2021/0344929 A1\* 11/2021 Choi ..................... H04N 19/11
2022/0094977 A1\* 3/2022 Kim ..................... H04N 19/184

OTHER PUBLICATIONS

Document: JCTVC-C079, Taichiro Shiodera et al:, "TE6 subset a: Bidirectional intra prediction," Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, 10 pages.

\* cited by examiner

INTRA PREDICTION METHOD AND APPARATUS

CROSS-REFERENCE TO RELATED APPLICATIONS

This is a continuation of International Patent Application No. PCT/CN2021/120642 filed on Sep. 26, 2021, which claims priority to Chinese Patent Application No. 202011043931.1 filed on Sep. 28, 2020. The disclosures of the aforementioned applications are hereby incorporated by reference in their entireties.

TECHNICAL FIELD

Embodiments of this application relate to the field of artificial intelligence (AI)-based video or picture compression technologies, and in particular, to an intra prediction method and an apparatus.

BACKGROUND

Video coding (video encoding and decoding) is used in a wide range of digital video applications, for example, broadcast digital television (TV), video transmission over the Internet and mobile networks, real-time conversational applications such as video chat and video conferencing, Digital Versatile Disc (DVD) and Blu-ray discs, video content acquisition and editing systems, and security applications of camcorders.

The amount of video data needed to depict even a short video can be substantial, which may result in difficulties when the data is to be sent or otherwise transmitted through a network with a limited bandwidth capacity. Therefore, video data is generally compressed before being transmitted through modern telecommunications networks. The size of a video may also be an issue when the video is stored on a storage device because memory resources may be limited. Video compression devices often use software and/or hardware at the source to encode the video data prior to transmission or storage, thereby decreasing the quantity of data needed to represent digital video pictures. The compressed data is then received at the destination by a video decompression device. With limited network resources and ever increasing demands of higher video quality, improved compression and decompression techniques that improve the compression ratio with little to no sacrifice in picture quality are desirable.

In recent years, deep learning is gaining popularity in the fields of picture and video encoding and decoding.

SUMMARY

This application provides an intra prediction method and an apparatus, to improve accuracy of intra prediction, reduce an error of intra prediction, and improve rate-distortion optimization (RDO) efficiency of intra prediction.

According to a first aspect, this application provides an intra prediction method including obtaining respective intra prediction modes or texture distributions of P reconstructed picture blocks in a surrounding region of a current block, where the surrounding region includes a spatial neighborhood of the current block; obtaining, based on the respective intra prediction modes or texture distributions of the P reconstructed picture blocks, Q priori candidate intra prediction modes of the current block and Q probability values that are of the current block and that correspond to the Q priori candidate intra prediction modes; obtaining, based on M probability values corresponding to M priori candidate intra prediction modes, M weighting factors corresponding to the M priori candidate intra prediction modes; separately performing intra prediction based on the M priori candidate intra prediction modes to obtain M predicted values; and obtaining a predicted value of the current block based on a weighted summation of the M predicted values and the corresponding M weighting factors.

The surrounding region of the current block includes a spatial neighborhood of the current block. Picture blocks of the spatial neighborhood may include a left candidate picture block located on a left side of the current block and an upper candidate picture block located above the current block. The reconstructed picture block may be an encoded picture block that has been encoded by an encoder side and whose reconstructed picture block has been obtained by the encoder side or a decoded picture block that has been decoded and reconstructed by a decoder side. The reconstructed picture block may also refer to a basic unit picture block of a preset size obtained by dividing an encoded picture block or a decoded picture block into equal sizes.

In solution 1, an intra prediction mode of a reconstructed picture block may include (1) a plurality of posteriori intra prediction modes of the reconstructed picture block, where the plurality of posteriori intra prediction modes are determined based on a reconstruction value of the reconstructed picture block and predicted values corresponding to a plurality of posteriori candidate intra prediction modes; or (2) an optimal intra prediction mode of the reconstructed picture block, where the optimal intra prediction mode is a posteriori intra prediction mode with a maximum probability value or a minimum prediction error value in the plurality of posteriori intra prediction modes.

The plurality of posteriori candidate intra prediction modes of the reconstructed picture block are obtained based on a plurality of priori candidate intra prediction modes of the reconstructed picture block. The plurality of posteriori candidate intra prediction modes may be the plurality of priori candidate intra prediction modes of the reconstructed picture block or may be some intra prediction modes in the plurality of priori candidate intra prediction modes of the reconstructed picture block. Respective pluralities of posteriori candidate intra prediction modes of the foregoing P reconstructed picture blocks may all be obtained based on the method, which are not enumerated herein.

The plurality of posteriori intra prediction modes of the reconstructed picture block may refer to the plurality of posteriori candidate intra prediction modes, or may refer to some intra prediction modes in the plurality of posteriori candidate intra prediction modes, for example, a plurality of specified intra prediction modes selected from the plurality of posteriori candidate intra prediction modes. Respective pluralities of posteriori intra prediction modes of the foregoing P reconstructed picture blocks may all be obtained based on the method, which are not enumerated herein.

In solution 2, a texture distribution of a reconstructed picture block includes a horizontal texture distribution of the reconstructed picture block and a vertical texture distribution of the reconstructed picture block.

A texture of a picture is a visual feature reflecting a homogeneity phenomenon in the picture, and reflects organization and arrangement attributes of a slowly or periodically changing surface structure on a surface of an object. The texture is different from picture features such as a grayscale and a color, and is represented by grayscale distributions of pixels and surrounding spatial neighborhoods. Different from the color feature, the texture feature is not a sample-based feature, but needs to be statistically calculated in a region including a plurality of samples. It may be considered that a texture of the reconstructed picture block includes many texture primitives. The texture distribution of the reconstructed picture block is analyzed based on the texture primitives. A representation form of a texture depends on different types of texture primitives, different directions of the texture primitives, and quantities of the texture primitives. The horizontal texture distribution of the reconstructed picture block may indicate a horizontal texture feature by using types of and quantities of texture primitives in the horizontal direction, and the vertical texture distribution may indicate a vertical texture feature by using types of and quantities of texture primitives in the vertical direction.

The respective intra prediction modes or texture distributions of the P reconstructed picture blocks may be input into a neural network, to obtain Q priori candidate intra prediction modes of the current block and Q probability values that are of the current block and that correspond to the Q priori candidate intra prediction modes. For the neural network, refer to descriptions of the training engine 25. Details are not described herein again.

The Q priori candidate intra prediction modes of the current block may refer to all the remaining intra prediction modes after the respective pluralities of posteriori intra prediction modes of the P reconstructed picture blocks are deduplicated, or may refer to some of all the remaining intra prediction modes after the respective pluralities of posteriori intra prediction modes of the P reconstructed picture blocks are deduplicated.

Optionally, M=Q. In this case, the M probability values refer to the Q probability values, and the M priori candidate intra prediction modes refer to the Q priori candidate intra prediction modes.

Optionally, M<Q. In this case, the M probability values are all greater than probability values in the Q probability values other than the M probability values, and the M priori candidate intra prediction modes corresponding to the M probability values are selected from the Q priori candidate intra prediction modes of the current block. That is, the first M probability values with maximum probability values are selected from the Q probability values that are of the current block and that correspond to the Q priori candidate intra prediction modes, M priori candidate intra prediction modes corresponding to the M probability values are selected from the Q priori candidate intra prediction modes of the current block, and weighting factors and predicted values are calculated based on the M probability values and the M priori candidate intra prediction modes, to obtain a predicted value of the current block. However, the remaining probability values, except the M probability values, in the plurality of probability values that are of the current block and that correspond to the plurality of priori candidate intra prediction modes may be ignored due to their small values. In this way, a calculation amount may be reduced, and efficiency of intra prediction can be improved.

Notably, "corresponding" in "the M probability values corresponding to the M priori candidate intra prediction modes" does not mean a one-to-one correspondence. For example, the current block has five priori candidate intra prediction modes, and a plurality of probability values corresponding to the five priori candidate intra prediction modes may be five probability values, or may be less than five probability values.

When a sum of the M probability values is 1, a probability value corresponding to a first priori candidate intra prediction mode is used as a weighting factor corresponding to the first priori candidate intra prediction mode. That is, respective weighting factors of the M priori candidate intra prediction modes are respective probability values of the M priori candidate intra prediction modes. Alternatively, when a sum of the M probability values is not 1, normalization processing is performed on the M probability values, and a normalized value of a probability value corresponding to a first priori candidate intra prediction mode is used as a weighting factor corresponding to the first priori candidate intra prediction mode. That is, the respective weighting factors of the M priori candidate intra prediction modes are normalized values of respective probability values of the M priori candidate intra prediction modes. The first priori candidate intra prediction mode is only a noun used for ease of description, does not refer to a specific priori candidate intra prediction mode, and represents any one of the Q priori candidate intra prediction modes. It can be learned that the sum of the plurality of weighting factors corresponding to the M priori candidate intra prediction modes is 1.

According to the principle of intra prediction, in a candidate intra prediction mode, a reference block in a surrounding region of a current block can be found, and intra prediction is performed on the current block based on the reference block, to obtain a predicted value corresponding to the candidate intra prediction mode. It can be learned that the predicted value of the current block corresponds to the candidate intra prediction mode. Therefore, intra prediction is separately performed based on the M priori candidate intra prediction modes, and M predicted values of the current block can be obtained.

A predicted value of the current block is obtained based on a weighted summation of the M predicted values and the corresponding M weighting factors. As described above, the M predicted values correspond to the M priori candidate intra prediction modes, and the M weighting factors also correspond to the M priori candidate intra prediction modes. Therefore, for a same priori candidate intra prediction mode, a correspondence is also established between a predicted value and a weighting factor that correspond to the priori candidate intra prediction mode, a weighting factor corresponding to a priori candidate motion vector is multiplied by a predicted value corresponding to the same priori candidate intra prediction mode, and then, a plurality of products corresponding to a plurality of priori candidate intra prediction modes are added, to obtain a predicted value of the current block.

In this application, a plurality of weighting factors and a plurality of predicted values of the current block are obtained based on respective intra prediction information of a plurality of reconstructed picture blocks in a surrounding region of the current block, a weighting factor corresponding to a priori candidate intra prediction mode is multiplied by a predicted value corresponding to the same priori candidate intra prediction mode, and then, a plurality of products corresponding to the plurality of priori candidate intra prediction modes are added to obtain a predicted value of the current block. In this way, the predicted value of the current block is obtained by combining a plurality of priori candidate intra prediction modes, so that rich and variable textures in the real world can be better fitted, thereby improving accuracy of intra prediction, reducing an error of intra prediction, and improving overall RDO efficiency of intra prediction.

In a possible implementation, in addition to the respective intra prediction modes of the P reconstructed picture blocks, respective related information of the P reconstructed picture blocks may be further obtained. Related information of a reconstructed picture block may be a plurality of posteriori intra prediction modes of the reconstructed picture block and a plurality of prediction error values corresponding to the plurality of posteriori intra prediction modes. The plurality of posteriori intra prediction modes and the plurality of prediction error values corresponding to the plurality of posteriori intra prediction modes are determined based on a reconstruction value of the reconstructed picture block and predicted values corresponding to the plurality of posteriori candidate intra prediction modes.

Intra prediction is separately performed based on a plurality of posteriori candidate intra prediction modes of the reconstructed picture block, to obtain a plurality of predicted values, where the plurality of predicted values correspond to the plurality of posteriori candidate intra prediction modes.

The plurality of predicted values is compared with the reconstruction value of the reconstructed picture block to obtain plurality of prediction error values. The plurality of prediction error values corresponds to the plurality of posteriori candidate intra prediction modes. In this application, a prediction error value corresponding to a posteriori candidate intra prediction mode may be obtained by using a method such as a sum of absolute differences (SAD) or a sum of squared differences (SSE).

If the plurality of posteriori intra prediction modes of the reconstructed picture block refer to the plurality of posteriori candidate intra prediction modes, the plurality of prediction error values that are of the reconstructed picture block and that correspond to the plurality of posteriori intra prediction modes refer to a plurality of prediction error values corresponding to the plurality of posteriori candidate intra prediction modes. If the plurality of posteriori intra prediction modes of the reconstructed picture block refer to some intra prediction modes in the plurality of posteriori candidate intra prediction modes, the plurality of prediction error values that are of the reconstructed picture block and that correspond to the plurality of posteriori intra prediction modes refer to prediction error values that are selected from the plurality of prediction error values corresponding to the plurality of posteriori candidate intra prediction modes and that correspond to the intra prediction modes.

Correspondingly, the input to the neural network includes respective pluralities of posteriori intra prediction modes of the P reconstructed picture blocks and a plurality of prediction error values corresponding to the pluralities of posteriori intra prediction modes.

In a possible implementation, in addition to the respective intra prediction modes of the P reconstructed picture blocks, respective related information of the P reconstructed picture blocks may be further obtained. Related information of a reconstructed picture block may be a plurality of posteriori intra prediction modes of the reconstructed picture block and a plurality of probability values corresponding to the plurality of posteriori intra prediction modes. The plurality of posteriori intra prediction modes and the plurality of probability values corresponding to the plurality of posteriori intra prediction modes are determined based on a reconstruction value of the reconstructed picture block and predicted values corresponding to the plurality of posteriori candidate intra prediction modes.

The plurality of probability values that are of the reconstructed picture block and that correspond to the plurality of posteriori intra prediction modes may be obtained based on the following two methods:

One is obtaining the plurality of probability values of the reconstructed picture block based on the plurality of prediction error values of the reconstructed picture block that are obtained in the foregoing method. For example, normalization processing may be performed on the plurality of prediction error values of the reconstructed picture block based on a method such as a normalized exponential function or a linear normalization method to obtain normalized values of the plurality of prediction error values. The normalized values of the plurality of prediction error values are plurality of probability values of the reconstructed picture block. Based on a correspondence between the plurality of prediction error values of the reconstructed picture block and the plurality of posteriori intra prediction modes, the plurality of probability values of the reconstructed picture block also correspond to the plurality of posteriori intra prediction modes of the reconstructed picture block, the probability value may represent a probability that the posteriori intra prediction mode corresponding to the probability value becomes the optimal intra prediction mode of the reconstructed picture block.

The other is inputting the reconstruction value of the reconstructed picture block and the plurality of predicted values of the reconstructed picture block that are obtained in the first method into the trained neural network, to obtain a plurality of probability values that are of the reconstructed picture block and that correspond to the plurality of posteriori intra prediction modes. For the neural network, refer to descriptions of the training engine 25. Details are not described herein again.

Correspondingly, the input to the neural network includes respective pluralities of posteriori intra prediction modes of the P reconstructed picture blocks and a plurality of probability values corresponding to the pluralities of posteriori intra prediction modes.

Therefore, after the plurality of prediction error values or probability values corresponding to the plurality of posteriori intra prediction modes are obtained based on the foregoing two methods, the optimal intra prediction mode of the reconstructed picture block may be obtained based on the following two methods:

One is using a posteriori intra prediction mode corresponding to a minimum prediction error value in the plurality of prediction error values corresponding to the plurality of posteriori intra prediction modes as the optimal intra prediction mode of the reconstructed picture block.

The other is using a posteriori intra prediction mode corresponding to a maximum probability value in the plurality of probability values corresponding to the plurality of posteriori intra prediction modes as the optimal intra prediction mode of the reconstructed picture block.

Notably, the optimal intra prediction mode in this application is only an intra prediction mode obtained based on one of the foregoing two methods, and is one of the plurality of posteriori intra prediction modes of the reconstructed picture block. However, the optimal intra prediction mode is not a unique intra prediction mode used when inter prediction is performed on the reconstructed picture block.

In a possible implementation, after the reconstruction value of the current block is obtained, the intra prediction mode or texture distribution of the current block may be immediately obtained. The obtaining method includes as follows.

1. Obtain, based on the reconstruction value of the current block and the predicted values corresponding to the plurality of posteriori candidate intra prediction modes of the current block, a plurality of posteriori intra prediction modes of the current block and a plurality of prediction error values that are of the current block and that correspond to the plurality of posteriori intra prediction modes, where the plurality of posteriori intra prediction modes of the current block are obtained based on the plurality of priori candidate intra prediction modes of the current block.

2. Obtain, based on the reconstruction value of the current block and the predicted values corresponding to the plurality of posteriori candidate intra prediction modes of the current block that are input to the neural network, a plurality of posteriori intra prediction modes of the current block and a plurality of probability values that are of the current block and that correspond to the plurality of posteriori intra prediction modes, where the plurality of posteriori intra prediction modes of the current block are obtained based on the plurality of priori candidate intra prediction modes of the current block, or obtain, based on the plurality of prediction error values of the current block, a plurality of probability values corresponding to the plurality of posteriori intra prediction modes of the current block.

3. Determine a posteriori intra prediction mode with a maximum probability value or a minimum prediction error value in the plurality of posteriori intra prediction modes of the current block as the optimal intra prediction mode of the current block.

4. Obtain a horizontal texture distribution of and a vertical texture of the current block.

In a possible implementation, the training data set based on which a training engine trains the neural network includes information about a plurality of groups of picture blocks. Information about each group of picture blocks includes respective pluralities of posteriori intra prediction modes of a plurality of reconstructed picture blocks, a plurality of probability values corresponding to the pluralities of posteriori intra prediction modes, a plurality of posteriori intra prediction modes of a current block, and a plurality of probability values that are of the current block and that correspond to the plurality of posteriori intra prediction modes. The plurality of reconstructed picture blocks are picture blocks in a spatial neighborhood of the current block. The neural network is obtained through training based on the training data set.

In a possible implementation, the training data set based on which a training engine trains the neural network includes information about a plurality of groups of picture blocks. Information about each group of picture blocks includes respective pluralities of posteriori intra prediction modes of a plurality of reconstructed picture blocks, a plurality of prediction error values corresponding to the pluralities of posteriori intra prediction modes, a plurality of posteriori intra prediction modes of a current block, and a plurality of probability values that are of the current block and that correspond to the plurality of posteriori intra prediction modes. The plurality of reconstructed picture blocks are picture blocks in a spatial neighborhood of the current block. The neural network is obtained through training based on the training data set.

In a possible implementation, the training data set based on which a training engine trains the neural network includes information about a plurality of groups of picture blocks. Information about each group of picture blocks includes respective optimal intra prediction modes of a plurality of reconstructed picture blocks, a plurality of posteriori intra prediction modes of a current block, and a plurality of probability values that are of the current block and that correspond to the plurality of posteriori intra prediction modes. The plurality of reconstructed picture blocks is a neighborhood of the current block. The neural network is obtained through training based on the training data set.

In a possible implementation, the training data set based on which a training engine trains the neural network includes information about a plurality of groups of picture blocks. Information about each group of picture blocks includes respective horizontal texture distributions of and respective vertical texture distributions of a plurality of reconstructed picture blocks, a plurality of posteriori intra prediction modes of a current block, and a plurality of probability values that are of the current block and that correspond to the plurality of posteriori intra prediction modes. The plurality of reconstructed picture blocks are picture blocks in a spatial neighborhood of the current block. The neural network is obtained through training based on the training data set.

Optionally, the neural network includes at least a convolutional layer and an activation layer. A depth of a convolution kernel of the convolutional layer is 2, 3, 4, 5, 6, 16, 24, 32, 48, 64, or 128, and a size of the convolution kernel of the convolutional layer is 1×1, 3×3, 5×5, or 7×7. For example, a size of a convolutional layer is 3×3×2×10, where 3×3 represents a size of a convolution kernel at the convolutional layer; 2 represents a depth of a convolution kernel included in the convolutional layer, and a quantity of data channels input into the convolutional layer is consistent with the depth of the convolution kernel included in the convolutional layer, that is, a quantity of data channels input to the convolutional layer is also 2; and 10 indicates a quantity of convolution kernels included in the convolutional layer, and a quantity of data channels output from the convolutional layer is consistent with a quantity of convolution kernels included in the convolutional layer, that is, the quantity of data channels output from the convolutional layer is also 10.

Optionally, the neural network includes a convolutional neural network (CNN), a deep neural network (DNN), or a recurrent neural network (RNN).

According to a second aspect, this application provides an encoder, including a processing circuit, configured to perform the method according to any one of the first aspect.

According to a third aspect, this application provides a decoder, including a processing circuit, configured to perform the method according to any one of the first aspect.

According to a fourth aspect, this application provides a computer program product, including program code. When executed on a computer or a processor, the computer program product is configured to perform the method according to any one of the first aspect.

According to a fifth aspect, this application provides an encoder, including: one or more processors; and a non-transitory computer-readable storage medium, coupled to the processors and storing a program for execution by the processors. When executed by the processor, the program enables the encoder to perform the method according to any one of the first aspect.

According to a sixth aspect, this application provides a decoder, including: one or more processors; and a non-transitory computer-readable storage medium, coupled to the processors and storing a program for execution by the processors. When executed by the processor, the program enables the decoder to perform the method according to any one of the first aspect.

According to a seventh aspect, this application provides a non-transitory computer-readable storage medium, including program code. When executed by a computer device, the program code is configured to perform the method according to any one of the first aspect.

According to an eighth aspect, the present disclosure relates to a decoding apparatus. For beneficial effects, refer to descriptions of the first aspect. Details are not described herein again. The decoding apparatus has a function of implementing behaviors in the method embodiment of the first aspect. The function may be implemented by hardware, or may be implemented by hardware executing corresponding software. The hardware or the software includes one or more modules corresponding to the foregoing function. In a possible design, the decoding apparatus includes an intra prediction module, configured to implement the method according to any one of the first aspect. These modules may implement corresponding functions in the method example in the first aspect. For details, refer to the detailed descriptions in the method example. Details are not described herein again.

Details of one or more embodiments are set forth in the accompanying drawings and the description below. Other features, objects, and advantages will be apparent from the description, drawings, and claims.

DESCRIPTION OF EMBODIMENTS

Figure 1A:
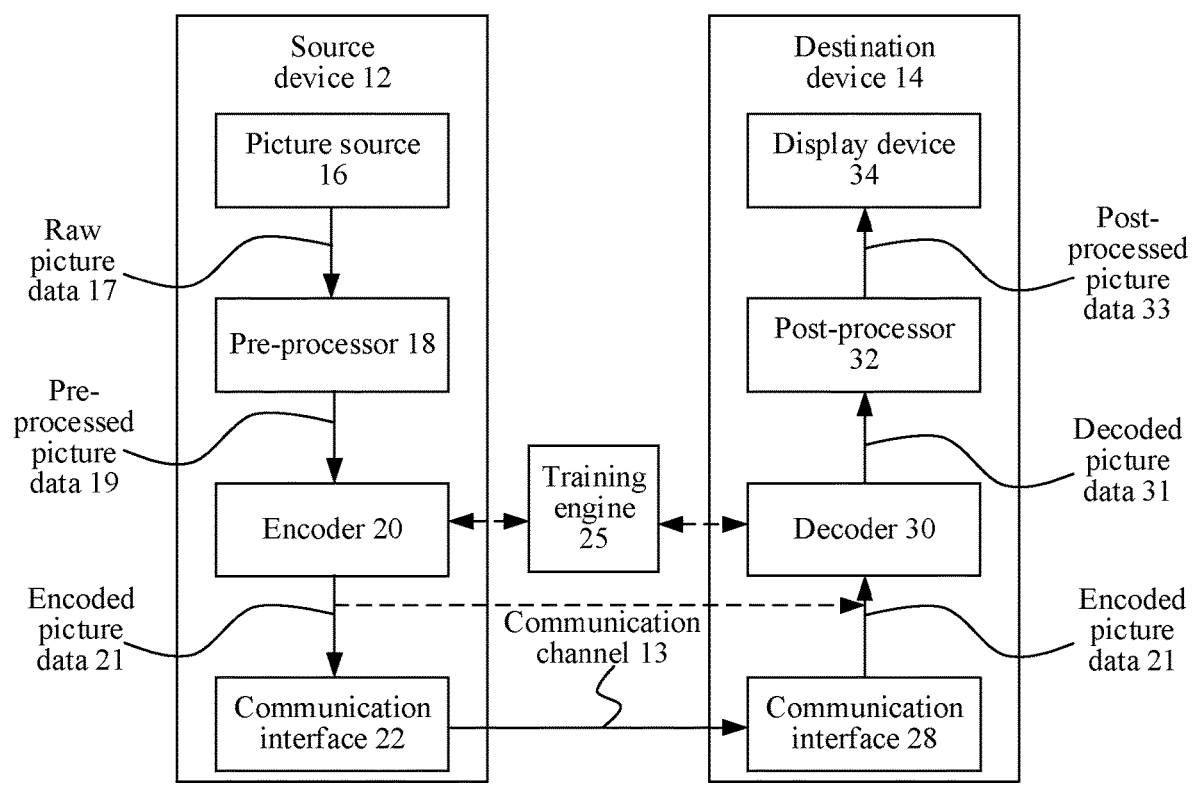
FIG. 1A is an example block diagram of a coding system 10 according to an embodiment of this application.

Embodiments of this application provide an AI-based video compression technology, in particular, provide a neural network-based video compression technology, and further provide a neural network (NN)-based intra prediction technology, to improve a conventional hybrid video encoding and decoding system.

Video coding typically refers to processing of a sequence of pictures, where the sequence of pictures forms a video or a video sequence. In the field of video coding, the terms "picture", "frame", and "image" may be used as synonyms. Video coding (or coding in general) includes two parts video encoding and video decoding. Video encoding is performed at a source side, typically including processing (for example, by compression) the original video pictures to reduce the amount of data required for representing the video pictures (for more efficient storage and/or transmission). Video decoding is performed at a destination side, and typically includes inverse processing relative to the encoder, to reconstruct the video picture. Embodiments referring to "coding" of video pictures (or pictures in general) shall be understood to relate to "encoding" or "decoding" of video pictures or respective video sequences. A combination of an encoding part and a decoding part is also referred to as CODEC (encoding and decoding).

In a case of lossless video coding, an original video picture can be reconstructed. In other words, a reconstructed video picture has same quality as the original video picture (assuming that no transmission loss or other data loss occurs during storage or transmission). In a case of lossy video coding, further compression is performed through, for example, quantization, to reduce an amount of data required for representing a video picture, and the video picture cannot be completely reconstructed on a decoder side. In other words, quality of a reconstructed video picture is lower or poorer than that of the original video picture.

Several video coding standards are used for "lossy hybrid video coding" (that is, spatial and temporal prediction in a sample domain is combined with two-dimensional (2D) transform coding for applying quantization in a transform domain). Each picture of a video sequence is typically partitioned into a set of non-overlapping blocks, and coding is typically performed at a block level. To be specific, at an encoder side, a video is usually processed, that is, encoded, at a block (video block) level. For example, a prediction block is generated through spatial (intra) prediction and temporal (inter) prediction, the prediction block is subtracted from a current block (block being processed or to be processed) to obtain a residual block, and the residual block is transformed in the transform domain and quantized to reduce an amount of data that is to be transmitted (compressed). At a decoder side, an inverse processing part relative to the encoder is applied to an encoded block or a compressed block to reconstruct the current block for representation. Furthermore, the encoder duplicates the decoder processing loop such that both generate identical predictions (for example, intra and inter predictions) and/or reconstructions for processing, that is, coding, the subsequent blocks.

In the following embodiment of the coding system 10, a video encoder 20 and a video decoder 30 are described based on FIG. 1A to FIG. 3.

FIG. 1A is an example block diagram of a coding system 10 according to an embodiment of this application, for example, a video coding system 10 (or a coding system 10 for short) that can use the technology of this application. The video encoder 20 (or the encoder 20 for short) and the video decoder 30 (or the decoder 30 for short) of the video coding system 10 represent examples of devices that may be configured to perform techniques in accordance with various examples described in this application.

As shown in FIG. 1A, the coding system 10 includes a source device 12. The source device 12 is configured to provide encoded picture data 21, such as an encoded picture, to a destination device 14 for decoding the encoded picture data 21.

The source device 12 includes an encoder 20, and may additionally, that is, optionally, include a picture source 16, a pre-processor (or pre-processing unit) 18 such as a picture pre-processor 18, and a communication interface (or communication unit) 22.

The picture source 16 may include or be any type of picture capturing device, for example, a camera for capturing a real-world picture, and/or any type of a picture generating device, for example, a computer-graphics processor for generating a computer animated picture, or any type of other device for obtaining and/or providing a real-world picture, a computer generated picture (for example, screen content or a virtual reality (VR) picture) and/or any combination thereof (for example, an augmented reality (AR) picture). The picture source may be any type of memory or storage storing any of the foregoing pictures.

In distinction to the processing performed by the pre-processor (or pre-processing unit) 18, a picture (or picture data) 17 may also be referred to as a raw picture or raw picture data 17.

The pre-processor 18 is configured to receive the raw picture data 17 and perform pre-processing on the raw picture data 17 to obtain a pre-processed picture (or pre-processed picture data) 19. Pre-processing performed by the pre-processor 18 may, for example, include trimming, color format conversion (for example, from red green blue (RGB) to luminance (Y), chroma blue (Cb) and chroma red (Cr) (YCbCr)), color correction, or de-noising. It can be understood that the pre-processing unit 18 may be optional component.

The video encoder (or encoder) 20 is configured to receive the pre-processed picture data 19 and provide encoded picture data 21 (further details are described below, for example, based on FIG. 2).

A communication interface 22 of the source device 12 may be configured to receive the encoded picture data 21 and send the encoded picture data 21 (or any further processed version thereof) over a communication channel 13 to another device, for example, the destination device 14 or any other device, for storage or direct reconstruction.

The destination device 14 includes a decoder 30, and may additionally, that is, optionally, include a communication interface (or communication unit) 28, a post-processor (or post-processing unit) 32, and a display device 34.

The communication interface 28 of the destination device 14 is configured to receive the encoded picture data 21 (or any further processed version thereof) directly from the source device 12 or from any other source device, for example, a storage device, where, for example, the storage device is an encoded picture data storage device, and provide the encoded picture data 21 to the decoder 30.

The communication interface 22 and the communication interface 28 may be configured to send or receive the encoded picture data (or encoded data) 21 via a direct communication link between the source device 12 and the destination device 14, for example, a direct wired or wireless connection, or via any type of network, for example, a wired or wireless network or any combination thereof, or any type of private network, any type of public network, or any type of combination thereof.

The communication interface 22 may be, for example, configured to package the encoded picture data 21 into an appropriate format, for example, packets, and/or process the encoded picture data using any type of transmission encoding or processing for transmission over a communication link or communication network.

The communication interface 28, forming the counterpart of the communication interface 22, may be, for example, configured to receive the transmitted data and process the transmission data using any type of corresponding transmission decoding or processing and/or de-packaging to obtain the encoded picture data 21.

Both a communication interface 22 and a communication interface 28 may be configured as unidirectional communication interfaces as indicated by the arrow corresponding to the communication channel 13 in FIG. 1A pointing from the source device 12 to the destination device 14, or bi-directional communication interfaces, and may be configured, for example, to send and receive messages, for example, to set up a connection, to acknowledge and exchange any other information related to the communication link and/or data transmission, for example, transmission of encoded picture data.

The video decoder (or decoder) 30 is configured to receive the encoded picture data 21 and provide decoded picture data 31 (further details will be described below, for example, based on FIG. 3).

The post-processor 32 is configured to perform post-processing on the decoded picture data 31 (also referred to as reconstructed picture data), for example, the decoded picture 31, to obtain post-processed picture data 33, for example, a post-processed picture 33. The post-processing performed by the post-processing unit 32 may include, for example, color format conversion (for example, from YCbCr to RGB), color correction, trimming, or re-sampling, or any other processing, for example, for preparing the decoded picture data 31 for display, for example, by the display device 34.

The display device 34 is configured to receive the post-processed picture data 33 for displaying the picture, for example, to a user or viewer. The display device 34 may be or include any type of display for representing the reconstructed picture, for example, an integrated or external display or monitor. For example, the display may include a liquid-crystal display (LCD), an organic light-emitting diode (OLED) display, a plasma display, a projector, a micro LED display, a liquid-crystal on silicon (LCoS) display, a digital light processor (DLP), or any type of other display.

The coding system 10 further includes a training engine 25. The training engine 25 is configured to train the encoder 20 (especially, an intra prediction unit in the encoder 20) or the decoder 30 (especially, an intra prediction unit in the decoder 30), to process an input picture, picture region, or picture block to generate a predicted value of the input picture, picture region, or picture block.

Optionally, in embodiments of this application, the training data set include information about a plurality of groups of picture blocks. Information about each group of picture blocks includes respective pluralities of posteriori intra prediction modes of a plurality of reconstructed picture blocks, a plurality of probability values corresponding to the pluralities of posteriori intra prediction modes, a plurality of posteriori candidate intra prediction modes of a current block, and a plurality of probability values that are of the current block and that correspond to the plurality of posteriori candidate intra prediction modes. The plurality of reconstructed picture blocks are picture blocks in a spatial neighborhood of the current block. A neural network is obtained through training based on the training data set. An input to the neural network is the respective pluralities of posteriori intra prediction modes of the plurality of reconstructed picture blocks in the surrounding region of the current block and the plurality of probability values corresponding to the pluralities of posteriori intra prediction modes, and an output from the neural network is a plurality of priori candidate intra prediction modes of a current block and a plurality of probability values that are of the current block and that correspond to the plurality of priori candidate intra prediction modes.

Optionally, the training data set in embodiments of this application includes information about a plurality of groups of picture blocks. Information about each group of picture blocks includes respective pluralities of posteriori intra prediction modes of a plurality of reconstructed picture blocks, a plurality of prediction error values corresponding to the pluralities of posteriori intra prediction modes, a plurality of posteriori candidate intra prediction modes of a current block, and a plurality of probability values that are of the current block and that correspond to the plurality of posteriori candidate intra prediction modes. The plurality of reconstructed picture blocks are picture blocks in a spatial neighborhood of the current block. A neural network is obtained through training based on the training data set. An input to the neural network is the respective pluralities of posteriori intra prediction modes of the plurality of reconstructed picture blocks in the surrounding region of the current block and the plurality of prediction error values corresponding to the pluralities of posteriori intra prediction modes, and an output from the neural network is a plurality of priori candidate intra prediction modes of a current block and a plurality of probability values that are of the current block and that correspond to the plurality of priori candidate intra prediction modes.

Optionally, in embodiments of this application, the training data set include information about a plurality of groups of picture blocks. Information about each group of picture blocks includes respective optimal intra prediction modes of a plurality of reconstructed picture blocks, a plurality of posteriori candidate intra prediction modes of a current block, and a plurality of probability values that are of the current block and that correspond to the plurality of posteriori candidate intra prediction modes. The plurality of reconstructed picture blocks are picture blocks in a spatial neighborhood of the current block. A neural network is obtained through training based on the training data set. An input to the neural network is the respective optimal intra prediction modes of the plurality of reconstructed picture blocks in the surrounding region of the current block, and an output from the neural network is a plurality of priori candidate intra prediction modes of a current block and a plurality of probability values that are of the current block and that correspond to the plurality of priori candidate intra prediction modes.

Optionally, in embodiments of this application, the training data set includes information about a plurality of groups of picture blocks. Information about each group of picture blocks includes respective horizontal texture distributions of and respective vertical texture distributions of a plurality of reconstructed picture blocks, a plurality of posteriori candidate intra prediction modes of a current block, and a plurality of probability values that are of the current block and that correspond to the plurality of posteriori candidate intra prediction modes. The plurality of reconstructed picture blocks are picture blocks in a spatial neighborhood of the current block. A neural network is obtained through training based on the training data set. An input to the neural network is the respective horizontal texture distributions of and the respective vertical texture distributions of the plurality of reconstructed picture blocks in the surrounding region of the current block, and an output from the neural network is a plurality of priori candidate intra prediction modes of a current block and a plurality of probability values that are of the current block and that correspond to the plurality of priori candidate intra prediction modes.

Optionally, in embodiments of this application, the training data set includes information about a plurality of groups of picture blocks. Information about each group of picture blocks includes a reconstruction value of the picture block, predicted values corresponding to a plurality of posteriori candidate intra prediction modes, a plurality of posteriori intra prediction modes of the picture block, and a plurality of probability values that are of the picture block and that correspond to the plurality of posteriori intra prediction modes. A neural network is obtained through training based on the training data set. An input to the neural network is the reconstruction value of the current block and the predicted values corresponding to the plurality of posteriori candidate intra prediction modes, and an output from the neural network is a plurality of posteriori intra prediction modes of the current block and a plurality of probability values that are of the current block and that correspond to the plurality of posteriori intra prediction modes.

In a process of training the neural network by the training engine 25, the output plurality of priori candidate intra prediction modes of the current block approximate the plurality of posteriori intra prediction modes of the current block, and the plurality of probability values corresponding to the plurality of priori candidate intra prediction modes approximate the plurality of probability values corresponding to the plurality of posteriori intra prediction modes. Each training process may be performed by using a small-batch size of 64 pictures and an initial learning rate of 1 e-4 and with a stride of 10. The information about the plurality of groups of picture blocks may be data generated when intra encoding is performed on a plurality of current blocks by an encoder. The neural network can implement the intra prediction method provided in embodiments of this application. To be specific, intra prediction modes and related information of a plurality of reconstructed picture blocks in a surrounding region of a current block are input into the neural network, to obtain a plurality of priori candidate intra prediction modes of the current block and a plurality of probability values that are of the current block and that correspond to the plurality of priori candidate intra prediction modes. The following describes the neural network in detail with reference to FIG. 6A to FIG. 6E.

The training data in embodiments of this application may be stored into a database (not shown). The training engine 25 obtains a target model (for example, may be a neural network for intra prediction of a picture) through training based on the training data. Notably, a source of the training data is not limited in embodiments of this application. For example, the training data may be obtained from a cloud or another place for model training.

The target model in embodiments of this application may be specifically an intra prediction network. The following describes the target model in detail with reference to FIG. 6A to FIG. 6E.

The target model obtained by the training engine 25 through training may be applied to the coding system 10, for example, applied to the source device 12 (for example, the encoder 20) or the destination device 14 (for example, the decoder 30) shown in FIG. 1A. The training engine 25 may obtain the target model through training on the cloud, and the coding system 10 downloads the target model from the cloud and uses the target model. Alternatively, the training engine 25 may obtain the target model through training on the cloud and use the target model, and the coding system 10 directly obtains a processing result from the cloud. For example, the training engine 25 obtains, through training, a target model having an intra prediction function. The coding system 10 downloads the target model from the cloud. Then, an intra prediction unit 254 in the encoder 20 or an intra prediction unit 354 in the decoder 30 may perform intra prediction on an input picture or picture block based on the target model, to obtain a prediction of the picture or picture block. In another example, the training engine 25 performs training to obtain a target model having an intra prediction function. The coding system 10 does not need to download the target model from the cloud. The encoder 20 or the decoder 30 transmits a picture or picture block to the cloud, and the cloud performs intra prediction on the picture or picture block by using the target model, to obtain a prediction of the picture or picture block, and transmits the prediction to the encoder 20 or the decoder 30.

Although FIG. 1A depicts the source device 12 and the destination device 14 as separate devices, embodiments of devices may also include both the source device 12 and the destination device 14 or functionality of both the source device 12 and the destination device 14, that is, both the source device 12 or corresponding functionality and the destination device 14 or corresponding functionality. In such embodiments, the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
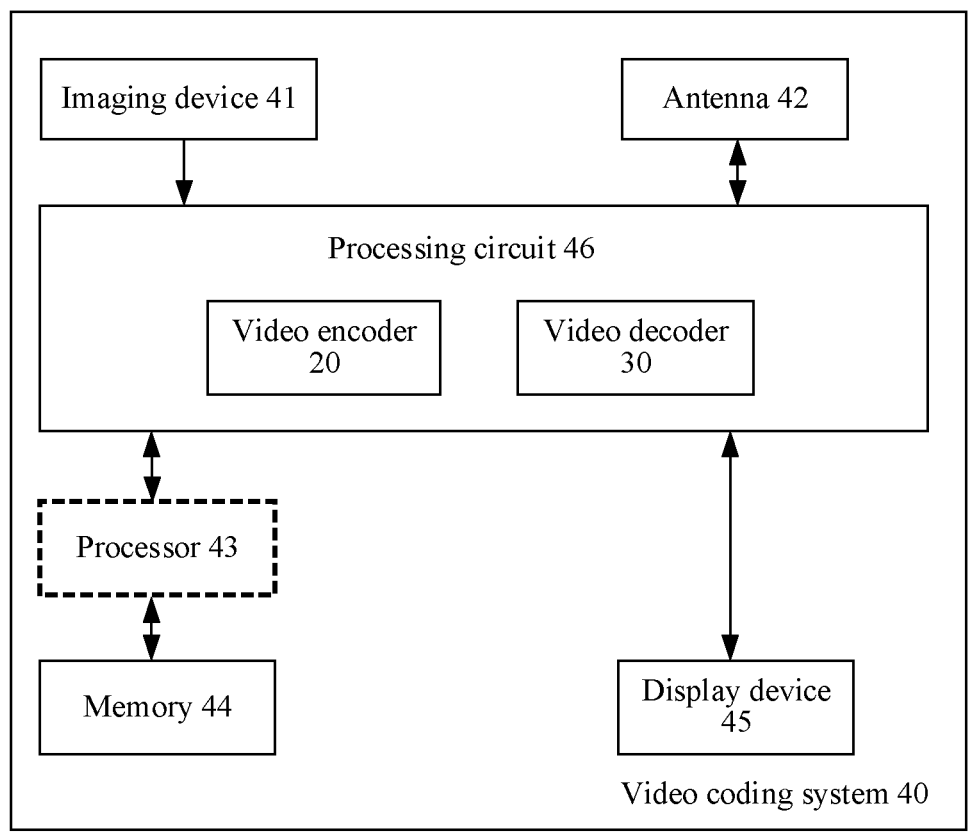
FIG. 1B is an example block diagram of a video coding system 40 according to an embodiment of this application.
Figure 5:
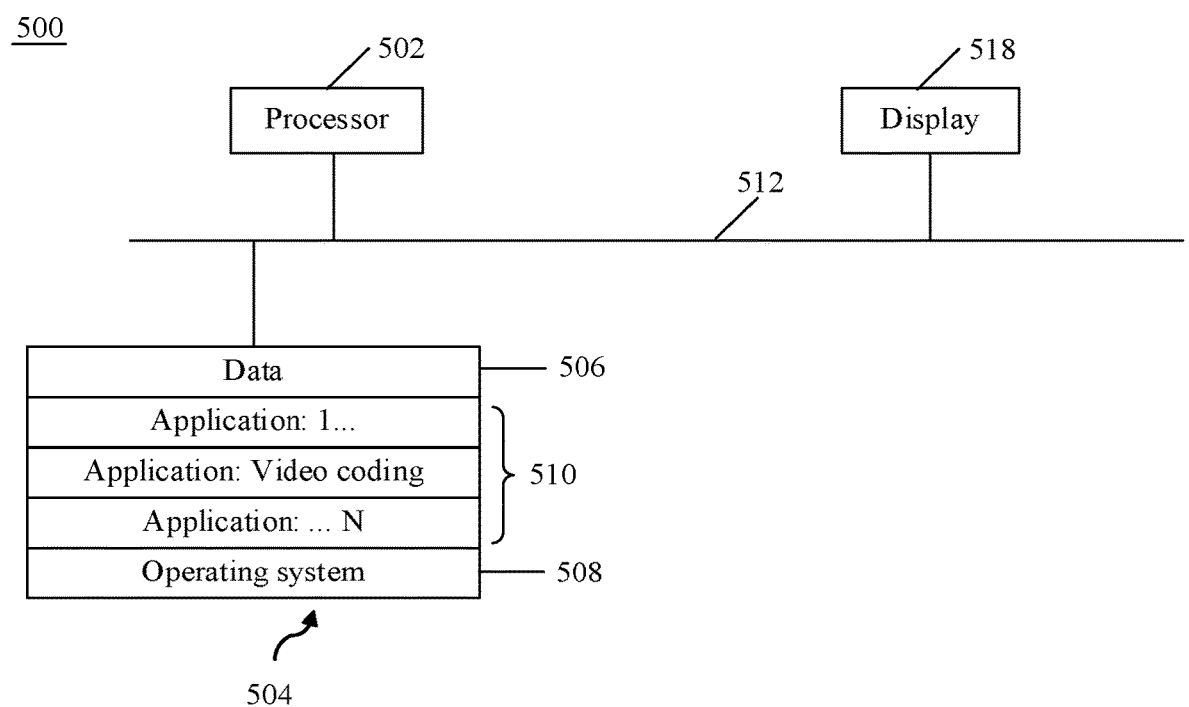
FIG. 5 is an example block diagram of an apparatus 500 according to an embodiment of this application.

The encoder 20 (for example, the video encoder 20) or the decoder 30 (for example, the video decoder 30) or both the encoder 20 and the decoder 30 may be implemented via a processing circuit as shown in FIG. 1B, such as one or more microprocessors, digital signal processors (DSPs), application-specific integrated circuits (ASICs), field-programmable gate arrays (FPGAs), discrete logic, hardware, video coding dedicated processors, or any combinations thereof. The encoder 20 may be implemented via a processing circuit 46 to include the various modules as discussed with reference to the encoder 20 of FIG. 2 and/or any other encoder system or subsystem described herein. The decoder 30 may be implemented via the processing circuit 46 to include the various modules as discussed with reference to the decoder 30 of FIG. 3 and/or any other decoder system or subsystem described herein. The processing circuit 46 may be configured to perform the various operations as discussed later. As shown in FIG. 5, if some techniques are implemented partially in software, a device may store instructions for the software in a suitable, non-transitory computer-readable storage medium and may execute the instructions in hardware using one or more processors to perform the techniques of this application. Either of the video encoder 20 and the video decoder 30 may be integrated as part of a combined CODEC in a single device, for example, as shown in FIG. 1B.

The source device 12 and the destination device 14 may include any of a wide range of devices, including any type of handheld or stationary devices, for example, notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver devices, broadcast transmitter devices, or the like and may use no or any type of operating system. In some cases, the source device 12 and the destination device 14 may be equipped for wireless communication. Therefore, the source device 12 and the destination device 14 may be wireless communication devices.

In some cases, the video coding system 10 illustrated in FIG. 1A is merely an example and the techniques provided in this application may be applied to video coding settings (for example, video encoding or video decoding) that do not necessarily include any data communication between the encoding and decoding devices. In other examples, data is retrieved from a local memory, streamed over a network, or the like. A video encoding device may encode data and store encoded data into the memory, and/or a video decoding device may retrieve data from the memory and decode the data. In some examples, the encoding and decoding is performed by devices that do not communicate with one another, but simply encode data to the memory and/or retrieve and decode data from the memory.

FIG. 1B is an example block diagram of a video coding system 40 according to an embodiment of this application. As shown in FIG. 1B, the video coding system 40 may include an imaging device 41, a video encoder 20, a video decoder 30 (and/or a video encoder/decoder implemented via a processing circuit 46), an antenna 42, one or more processors 43, one or more memories 44, and/or a display device 45.

As shown in FIG. 1B, the imaging device 41, the antenna 42, the processing circuit 46, the video encoder 20, the video decoder 30, the processor 43, the memory 44, and/or the display device 45 can communicate with each other. The video coding system 40 may include only the video encoder 20 or only the video decoder 30 in different examples.

In some examples, the antenna 42 may be configured to transmit or receive an encoded bitstream of video data. Further, in some examples, the display device 45 may be configured to present the video data. The processing circuit 46 may include ASIC logic, a graphics processing unit, a general-purpose processor, or the like. The video coding system 40 may also include the optional processor 43. The optional processor 43 may similarly include ASIC logic, a graphics processing unit, a general-purpose processor, or the like. In addition, the memory 44 may be a memory of any type, for example, a volatile memory (for example, a static random-access memory (SRAM) or a dynamic random-access memory (DRAM)) or a nonvolatile memory (for example, a flash memory). In a non-limitative example, the memory 44 may be implemented by a cache memory. In other examples, the processing circuit 46 may include a memory (for example, a cache) for implementing a picture buffer.

In some examples, the video encoder 20 implemented via the logic circuit may include a picture buffer (which is implemented via, for example, the processing circuit 46 or the memory 44) and a graphics processing unit (which is implemented via, for example, the processing circuit 46). The graphics processing unit may be communicatively coupled to the picture buffer. The graphics processing unit may include a video encoder 20 implemented via the processing circuit 46 to embody the various modules as discussed with reference to FIG. 2 and/or any other encoder system or subsystem described herein. The logic circuit may be configured to perform various operations described in this specification.

In some examples, the video decoder 30 may be implemented via the logic circuit 46 in a similar manner to embody the various modules as discussed with reference to the video decoder 30 in FIG. 3 and/or any other decoder system or subsystem described herein. In some examples, the video decoder 30 implemented via the logic circuit may include a picture buffer (which is implemented via the processing circuit 46 or the memory 44) and a graphics processing unit (which is implemented via, for example, the processing circuit 46). The graphics processing unit may be communicatively coupled to the picture buffer. The graphics processing unit may include a video decoder 30 implemented via logic circuitry 46 to embody the various modules as discussed with reference to FIG. 3 and/or any other decoder system or subsystem described herein.

In some examples, the antenna 42 may be configured to receive an encoded bitstream of video data. As described, the encoded bitstream may include data, an indicator, an index value, mode selection data, or the like related to video frame encoding described in this specification, for example, data related to coding partitioning (for example, a transform coefficient or a quantized transform coefficient, an optional indicator (as described), and/or data defining the coding partitioning). The video coding system 40 may further include the video decoder 30 that is coupled to the antenna 42 and that is configured to decode the encoded bitstream. The display device 45 is configured to present a video frame.

It should be understood that in embodiments of this application, for the example described with reference to the video encoder 20, the video decoder 30 may be configured to perform a reverse process. With regard to a signaling syntactic element, the video decoder 30 may be configured to receive and parse such a syntactic element and correspondingly decode related video data. In some examples, the video encoder 20 may entropy encode the syntactic element into an encoded video bitstream. In such examples, the video decoder 30 may parse such a syntactic element and correspondingly decode related video data.

For ease of description, embodiments of this application are described with reference to Versatile Video Coding (VVC) reference software or High-Efficiency Video Coding (HEVC) developed by the International Telecommunication Union-Telecommunication (ITU-T) Video Coding Expert Group (VCEG) and the Joint Collaboration Team on Video Coding (JCT-VC) of the International Organization for Standardization/The International Electrotechnical Commission (ISO/IEC) motion picture experts group (MPEG). A person of ordinary skill in the art understands that embodiments of this application are not limited to HEVC or VVC.

Encoder and Encoding Method

Figure 2:
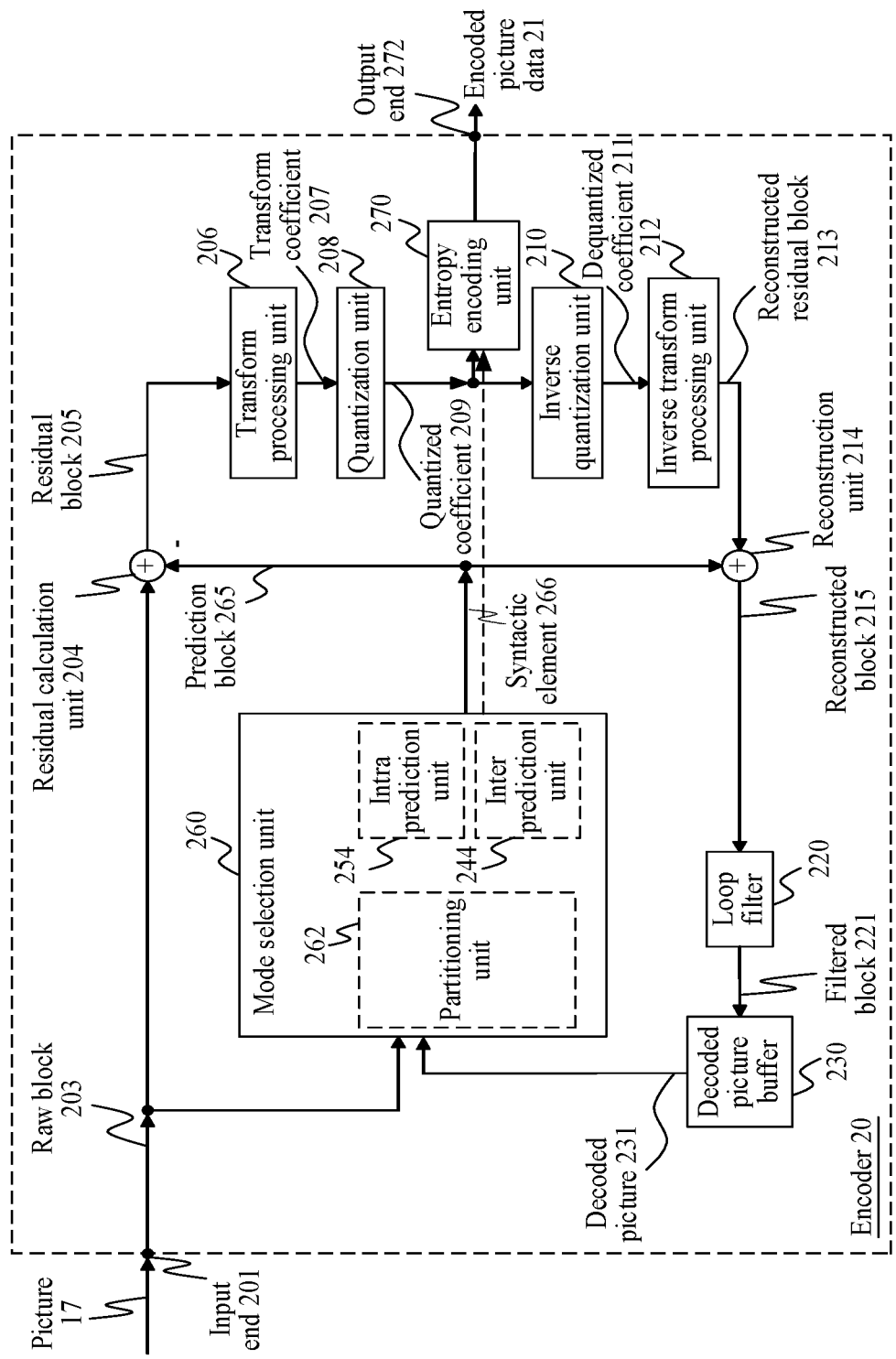
FIG. 2 is an example block diagram of a video encoder 20 according to an embodiment of this application.

FIG. 2 is an example block diagram of a video encoder 20 according to an embodiment of this application. As shown in FIG. 2, the video encoder 20 includes an input end (or input interface) 201, a residual calculation unit 204, a transform processing unit 206, a quantization unit 208, an inverse quantization unit 210, and inverse transform processing unit 212, a reconstruction unit 214, a loop filter 220, a decoded picture buffer (DPB) 230, a mode selection unit 260, an entropy encoding unit 270 and an output end (or output interface) 272. The mode selection unit 260 may include an inter prediction unit 244, an intra prediction unit 254 and a partitioning unit 262. The inter prediction unit 244 may include a motion estimation unit and a motion compensation unit (not shown). The video encoder 20 shown in FIG. 2 may also be referred to as a hybrid video encoder or a video encoder based on a hybrid video codec.

Referring to FIG. 2, the intra prediction unit is a trained target model (also referred to as a neural network). The neural network is configured to process an input picture, picture region, or picture block, to generate a predicted value of the input picture block. For example, the neural network for intra prediction is configured to receive an input picture, picture region, or picture block, and generate a predicted value of the input picture, picture region, or picture block. The following describes in detail a neural network for intra prediction with reference to FIG. 6A to FIG. 6E.

The residual calculation unit 204, the transform processing unit 206, the quantization unit 208, the mode selection unit 260 may form a forward signal path of the encoder 20, and the inverse quantization unit 210, the inverse transform processing unit 212, the reconstruction unit 214, the buffer 216, the loop filter 220, the DPB 230, the inter prediction unit 244, and the intra prediction unit 254 may form a backward signal path of the video encoder. The backward signal path of the video encoder 20 corresponds to the signal path of the decoder (see the video decoder 30 in FIG. 3). The inverse quantization unit 210, the inverse transform processing unit 212, the reconstruction unit 214, the loop filter 220, the DPB 230, the inter prediction unit 244 and the intra prediction unit 254 also form the "built-in decoder" of video encoder 20.

Picture and Picture Partitioning (Picture and Block)

The encoder 20 may be configured to receive, for example, via the input end 201, a picture (or picture data) 17, for example, a picture in a sequence of pictures forming a video or video sequence. The received picture or picture data may also be a pre-processed picture (or pre-processed picture data) 19. For simplicity, the picture 17 is used in the following descriptions. The picture 17 may also be referred to as a current picture or a to-be-coded picture (in particular in video coding to distinguish the current picture from other pictures, for example, previously encoded and/or decoded pictures of the same video sequence, that is, the video sequence which also includes the current picture).

A (digital) picture is or can be regarded as a two-dimensional array or matrix of samples with intensity values. A sample in the array may also be referred to as a pixel (pixel or pel) (short form of picture element). A quantity of samples in horizontal and vertical directions (or axes) of the array or picture defines the size and/or resolution of the picture. For representation of color, three color components are usually employed, to be specific, the picture may be represented as or include three sample arrays. In an RBG format or color space, a picture includes corresponding red, green, and blue sample arrays. However, in video coding, each pixel is typically represented in a luminance and chrominance format or color space, for example, YCbCr, which includes a luminance component indicated by Y (sometimes L is also used instead) and two chrominance components indicated by Cb and Cr. The luminance (luma) component Y represents the brightness or gray level intensity (for example, like in a gray-scale picture), while the two chrominance (chroma for short) components Cb and Cr represent the chromaticity or color information components. Accordingly, a picture in a YCbCr format includes a luminance sample array of luminance sample values (Y), and two chrominance sample arrays of chrominance values (Cb and Cr). Pictures in the RGB format may be converted or transformed into the YCbCr format and vice versa, the process is also known as color transformation or conversion.

If a picture is monochrome, the picture may include only a luminance sample array. Accordingly, a picture may be, for example, an array of luma samples in a monochrome format or an array of luma samples and two corresponding arrays of chroma samples in 4:2:0, 4:2:2, and 4:4:4 color formats.

Embodiments of the video encoder 20 may include a picture partitioning unit (not depicted in FIG. 2) configured to partition the picture 17 into a plurality of (typically non-overlapping) picture blocks 203. The blocks may also be referred to as root blocks, macroblocks (H.264/AVC), coding tree blocks (CTBs), or coding tree units (CTUs) in the H.265/HEVC and VVC standards. The picture partitioning unit may be configured to use the same block size for all pictures of a video sequence and the corresponding grid defining the block size, or change the block size between pictures or subsets or groups of pictures, and partition each picture into the corresponding blocks.

In further embodiments, the video encoder may be configured to receive directly a block 203 of the picture 17, for example, one, several, or all blocks forming the picture 17. The picture block 203 may also be referred to as a current picture block or a to-be-coded picture block.

Like the picture 17, the picture block 203 again is or can be regarded as a two-dimensional array or matrix of samples with intensity values (sample values), although of a smaller dimension than the picture 17. In other words, the block 203 may include, for example, one sample array (for example, a luma array in case of a monochrome picture 17, or a luma or chroma array in case of a color picture) or three sample arrays (for example, a luma and two chroma arrays in case of a color picture 17) or any other quantity and/or type of arrays depending on the color format applied. The quantities of samples in horizontal and vertical directions (or axes) of the block 203 define the size of the block 203. Correspondingly, a block may, for example, be an M×N (M columns×N rows) array of samples, or an M×N array of transform coefficients.

In an embodiment, the video encoder 20 shown in FIG. 2 may be configured to encode the picture 17 block by block, for example, the encoding and prediction is performed per block 203.

In an embodiment, the video encoder 20 shown in FIG. 2 may be further configured to partition and/or encode the picture by using slices (also referred to as video slices). A picture may be partitioned into or encoded using one or more slices (typically non-overlapping). Each slice may include one or more blocks (for example, CTUs) or one or more groups of blocks (for example, tiles (tile) in the H.265/HEVC/VVC standard or bricks (brick) in the VVC standard).

In an embodiment, the video encoder 20 shown in FIG. 2 may be further configured to partition and/or encode the picture by using slices/tile groups (also referred to as video tile groups) and/or tiles (also referred to as video tiles). A picture may be partitioned into or encoded using one or more slices/tile groups (typically non-overlapping), and each slice/tile group may include, for example, one or more blocks (for example, CTUs) or one or more tiles. Each tile, for example, may be of rectangular shape and may include one or more blocks (for example, CTUs), for example, complete or fractional blocks.

Residual Calculation

The residual calculation unit 204 is configured to calculate a residual block 205 based on the picture block (or the raw block) 203 and a prediction block 265 (the prediction block 265 is described in detail subsequently): for example, subtract a sample value of the prediction block 265 from a sample value of the picture block 203 sample by sample (pixel by pixel) to obtain a residual block 205 in a pixel domain.

Transform

The transform processing unit 206 may be configured to apply a transform, for example, a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as transforms specified in HEVC/H.265. Compared with an orthogonal DCT transform, such integer approximations are usually scaled based on a factor. To preserve a norm of a residual block that is processed through forward and inverse transforms, an additional scale factor is applied as a part of the transform process. The scale factor is usually selected based on some constraints, for example, the scale factor being a power of two for a shift operation, a bit depth of the transform coefficient, and a tradeoff between accuracy and implementation costs. A specific scale factor is, for example, specified for an inverse transform by the inverse transform processing unit 212 on the encoder side 20 (and the corresponding inverse transform, for example, by an inverse transform processing unit 312 on the decoder side 30), and a corresponding scale factor for the forward transform by the transform processing unit 206 on the encoder side 20 may be specified correspondingly.

Embodiments of the video encoder 20 (correspondingly, the transform processing unit 206) may be configured to output transform parameters, for example, a type of transform or transforms, for example, directly or encoded or compressed via the entropy encoding unit 270, so that, for example, the video decoder 30 may receive and use the transform parameters for decoding.

Quantization

The quantization unit 208 may be configured to quantize the transform coefficients 207 to obtain quantized coefficients 209, for example, by applying scalar quantization or vector quantization. The quantized transform coefficient 209 may also be referred to as a quantized residual coefficient 209.

A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization stride corresponds to finer quantization, and a larger quantization stride corresponds to coarser quantization. An appropriate quantization stride may be indicated by a QP. For example, the quantization parameter may be an index to a predefined set of appropriate quantization strides. For example, a smaller quantization parameter may correspond to finer quantization (a smaller quantization stride) and a larger quantization parameter may correspond to coarser quantization (a larger quantization stride), or vice versa. The quantization may include division by a quantization stride, and corresponding or inverse dequantization, for example, by an inverse quantization unit 210, may include multiplication by the quantization stride. Embodiments according to some standards, for example, the HEVC, may be configured to use a quantization parameter to determine the quantization stride. Generally, the quantization stride may be calculated based on a quantization parameter by using a fixed point approximation of an equation including division. Additional scale factors may be introduced for quantization and dequantization to restore the norm of the residual block, where the norm of the residual block may be modified because of a scale used in the fixed point approximation of the equation for the quantization stride and the quantization parameter. In one example implementation, the scaling of the inverse transform and dequantization may be combined. Alternatively, customized quantization tables may be used and signaled from an encoder to a decoder, for example, in a bitstream. The quantization is a lossy operation, where the loss increases with increasing of the quantization stride.

Embodiments of the video encoder 20 (correspondingly, the quantization unit 208) may be configured to output QPs, for example, directly or encoded via the entropy encoding unit 270 such that, for example, the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, for example, by applying the inverse of the quantization scheme applied by the quantization unit 208 based on or using the same quantization stride as the quantization unit 208. The dequantized coefficients 211 may also be referred to as dequantized residual coefficients 211 and correspond, although typically not identical to the transform coefficients due to the loss by quantization, to the transform coefficients 207.

Inverse Transform

The inverse transform processing unit 212 is configured to apply the inverse transform of the transform applied by the transform processing unit 206, for example, an inverse DCT, an inverse DST, or other inverse transforms, to obtain a reconstructed residual block 213 (or corresponding dequantized coefficients 213) in the sample domain. The reconstructed residual block 213 may also be referred to as a transform block 213.

Reconstruction

The reconstruction unit 214 (for example, an adder or a summer 214) is configured to add the transform block 213 (that is, the reconstructed residual block 213) to the prediction block 265 to obtain a reconstructed block 215 in the sample domain, for example, by adding, sample by sample, the sample values of the reconstructed residual block 213 and the sample values of the prediction block 265.

Filtering

The loop filter unit 220 (or a "loop filter" 220 for short) is configured to filter the reconstructed block 215 to obtain a filtered block 221, or in general, to filter reconstructed samples to obtain filtered sample values. The loop filter unit is, for example, configured to smooth pixel transitions, or otherwise improve the video quality. The loop filter unit 220 may include one or more loop filters such as a de-blocking filter, a sample-adaptive offset (SAO) filter or one or more other filters, for example, an adaptive loop filter (ALF), a noise suppression filter (NSF), or any combination thereof. In an example, the loop filter unit 220 may include a de-blocking filter, a SAO, filter and an ALF filter. The order of the filtering process may be the deblocking filter, SAO, and ALF. In another example, a process referred to as the luma mapping with chroma scaling (LMCS) (namely, the adaptive in-loop reshaper) is added. This process is performed before deblocking. In another example, the deblocking filter process may be also applied to internal sub-block edges, for example, affine sub-block edges, advanced temporal motion vector prediction (ATMVP) sub-block edges, sub-block transform (SBT) edges and intra sub-partition (ISP) edges. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

In an embodiment, the video encoder 20 (correspondingly, the loop filter unit 220) may be configured to output loop filter parameters (such as SAO filter parameters or ALF filter parameters or LMCS parameters), for example, directly or encoded via the entropy encoding unit 270, so that, for example, a decoder 30 may receive and apply the same loop filter parameters or different loop filters for decoding.

Decoded Picture Buffer

The DPB 230 may be a memory that stores reference pictures, or in general reference picture data, for encoding video data by the video encoder 20. The DPB 230 may be formed by any of a variety of memory devices, such as a DRAM, including a synchronous DRAM (SDRAM), a magnetoresistive RAM (MRAM), resistive RAM (RRAM), or other types of memory devices. The decoded picture buffer 230 may be configured to store one or more filtered blocks 221. The decoded picture buffer 230 may be further configured to store other previously filtered blocks, for example, previously reconstructed and filtered blocks 221, of the same current picture or of different pictures, for example, previously reconstructed pictures, and may provide complete previously reconstructed, that is, decoded, pictures (and corresponding reference blocks and samples) and/or a partially reconstructed current picture (and corresponding reference blocks and samples), for example for inter prediction. The decoded picture buffer 230 may be also configured to store one or more unfiltered reconstructed blocks 215, or in general unfiltered reconstructed samples, for example, if the reconstructed block 215 is not filtered by the loop filter unit 220, or any other further processed version of the reconstructed blocks or samples.

Mode Selection (Partitioning and Prediction)

The mode selection unit 260 includes a partitioning unit 262, an inter prediction unit 244, and an intra prediction unit 254, and is configured to receive or obtain raw picture data, for example, a raw block 203 (the current block 203 of the current picture 17), and reconstructed picture data, for example, filtered and/or unfiltered reconstructed samples or blocks of the same (current) picture and/or from one or a plurality of previously decoded pictures, for example, from the decoded picture buffer 230 or other buffers (for example, a line buffer, not shown). The reconstructed picture data is used as reference picture data for prediction, for example, inter prediction or intra prediction, to obtain a prediction block 265 or predicted value 265.

The mode selection unit 260 may be configured to determine or select a type of partitioning for a current block (including no partitioning) and a prediction mode (for example, an intra or inter prediction mode) and generate a corresponding prediction block 265, for the calculation of the residual block 205 and for the reconstruction of the reconstructed block 215.

In an embodiment, the mode selection unit 260 may be configured to select the partitioning and the prediction mode (for example, from those supported by or available for the mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on RDO, that is, select the prediction mode which provides a minimum rate distortion. Terms such as "best", "lowest", and "optimal" in this specification do not necessarily refer to "best", "lowest", and "optimal" in general, but may refer to a case in which a termination or selection criterion is met. For example, a value exceeding or below a threshold or other limitations may result in a "suboptimal selection", but complexity and processing time are reduced.

In other words, the partitioning unit 262 may be configured to partition a picture from a video sequence into a sequence of CTUs, and the CTU 203 may be further partitioned into smaller block partitions or sub-blocks (which form again blocks), for example, iteratively using quad-tree partitioning (QT), binary partitioning (BT), or triple-tree partitioning (TT), or any combination thereof, and perform, for example, the prediction for each of the block partitions or sub-blocks. The mode selection includes the selection of the tree-structure of the partitioned block 203, and the prediction modes are applied to each of the block partitions or sub-blocks.

The partitioning (for example, performed by the partitioning unit 262) and prediction processing (for example, performed by the inter prediction unit 244 and the intra prediction unit 254) performed by a video encoder 20 will be explained below in detail.

Partitioning

The partitioning unit 262 may partition (or divide) a picture block (or CTU) 203 into smaller parts, for example, small blocks in a square or rectangular shape. For a picture that has three sample arrays, a CTU including an N×N block of luma samples together with two corresponding blocks of chroma samples. The maximum allowable size of the luma block in the CTU is specified as 128×128 in the VVC standard being developed, but may be specified as a value different from 128×128 in the future, such as 256×256. The CTUs of a picture may be clustered/grouped as slices/tile groups, tiles or bricks. A tile covers a rectangular region of a picture, and a tile can be divided into one or more bricks. A brick includes a plurality of CTU rows within a tile. A tile that is not partitioned into a plurality of bricks can be referred to as a brick. However, a brick is a true subset of a tile and is not referred to as a tile. There are two modes of tile groups are supported in VVC, namely, the raster-scan slice/tile group mode and the rectangular slice mode. In the raster-scan tile group mode, a slice/tile group includes a sequence of tiles in tile raster scan of a picture. In the rectangular slice mode, a slice includes a plurality of bricks of a picture that collectively form a rectangular region of the picture. The bricks within a rectangular slice are in the order of brick raster scan of the slice. These smaller blocks (which may also be referred to as sub-blocks) may be further partitioned into even smaller partitions. This is also referred to tree-partitioning or hierarchical tree-partitioning, where a root block, for example, at root tree-level 0 (hierarchy-level 0, depth 0), may be recursively partitioned, for example, partitioned into two or more blocks of a next lower tree-level, for example, nodes at tree-level 1 (hierarchy-level 1, depth 1). These blocks may be again partitioned into two or more blocks of a next lower level, for example, tree-level 2 (hierarchy-level 2, depth 2), until the partitioning is terminated (because a termination criterion is fulfilled, for example, a maximum tree depth or minimum block size is reached). Blocks which are not further partitioned are also referred to as leaf-blocks or leaf nodes of the tree. A tree partitioned into two partitions is referred to as a BT, a tree partitioned into three partitions is referred to as a TT, and a tree partitioned into four partitions is referred to as a QT.

For example, a CTU may be or include a CTB of luma samples, two corresponding CTBs of chroma samples of a picture that has three sample arrays, or a CTB of samples of a monochrome picture, or a CTB of samples of a picture that is coded using three separate color planes and syntax structures (for coding the samples). Correspondingly, a CTB may be an N×N block of samples for some value of N such that the division of a component into CTBs is a partitioning. A coding unit (CU) may be or include a coding block of luma samples, two corresponding coding blocks of chroma samples of a picture that has three sample arrays, or a coding block of samples of a monochrome picture, or a coding block of samples of a picture that is coded using three separate color planes and syntax structures (for coding the samples). Correspondingly, a coding block (CB) may be an M×N block of samples for some values of M and N such that the division of a CTB into coding blocks is a partitioning.

In embodiments, for example, according to HEVC, a CTU may be split into a plurality of CUs by using a quad-tree structure denoted as a coding tree. The decision whether to code a picture region using inter (temporal) or intra (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quad-tree structure similar to the coding tree for the CU.

In embodiments, for example, according to the latest video coding standard currently in development (which is referred to as VVC), a combined quad-tree nested multi-type tree (for example, a binary-tree and a ternary-tree) splits a segmentation structure for partitioning a coding tree unit. In the coding tree structure within a coding tree unit, a CU can have either a square or rectangular shape. For example, the CTU is first partitioned by a quad-tree. Then the quad-tree leaf nodes can be further partitioned by a multi-type tree structure. There are four splitting types in a multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are referred to as CUs, and unless the CU is too large for the maximum transform length, this segmentation is used for prediction and transform processing without any further partitioning. This means that, in most cases, the CU, PU, and TU have the same block size in the quad-tree with a nested multi-type tree coding block structure. The exception occurs when maximum supported transform length is smaller than the width or height of the color component of the CU. VVC develops a unique signaling mechanism of the partition splitting information in quad-tree with a nested multi-type tree coding structure. In the signaling mechanism, a CTU is treated as the root of a quad-tree and is first partitioned by a quad-tree structure. Each quad-tree leaf node (when sufficiently large to allow it) is then further partitioned by a multi-type tree structure. In the multi-type tree structure, a first flag (mtt_split_cu_flag) is signaled to indicate whether the node is further partitioned; when a node is further partitioned, a second flag (mtt_split_cu_vertical_flag) is signaled to indicate the splitting direction, and then, a third flag (mtt_split_cu_binary_flag) is signaled to indicate whether the split is a binary split or a ternary split. Based on the values of mtt_split_cu_vertical_flag and mtt_split_cu_binary_flag, the multi-type tree slitting mode (MttSplitMode) of a CU can be derived by a decoder based on a predefined rule or a table. It should be noted, for a specific design, for example, 64×64 luma block and 32×32 chroma pipelining design in VVC hardware decoders, TT split is forbidden when either width or height of a luma coding block is larger than 64, as shown in FIG. 6. TT split is also forbidden when either width or height of a chroma coding block is larger than 32. The pipelining design divides a picture into a plurality of virtual pipeline data units (VPDU), and all the VPDU are defined as non-overlapping units in a picture. In hardware decoders, successive VPDUs are processed by a plurality of pipeline stages simultaneously. The VPDU size is roughly proportional to the buffer size in most pipeline stages, so it is important to keep the VPDU size small. In most hardware decoders, the VPDU size can be set to a maximum transform block (TB) size. However, in VVC, TT and BT partition may lead to the increasing of the size of the VPDU.

In addition, notably, when a portion of a tree node block exceeds the bottom or right picture boundary, the tree node block is forced to be split until all the samples of every coded CU are located inside the picture boundaries.

As an example, the intra sub-partition (ISP) tool may divide luma intra-predicted blocks vertically or horizontally into two or four sub-partitions depending on the block size.

In one example, the mode selection unit 260 of the video encoder 20 may be configured to perform any combination of the partitioning techniques described herein.

As described above, the video encoder 20 is configured to determine or select the best or an optimum prediction mode from a set of (for example, pre-determined) prediction modes. The set of prediction modes may include, for example, intra prediction modes and/or inter prediction modes.

Intra Prediction

A set of intra prediction modes may include 35 different intra prediction modes, for example, non-directional modes such as a DC (or average) mode and a planar mode, or directional modes such as those defined in HEVC, or may include 67 different intra prediction modes, for example, non-directional modes such as a DC (or average) mode and a planar mode, or directional modes such as those defined in VVC. For example, several conventional angular intra prediction modes are adaptively replaced with wide-angle intra prediction modes for the non-square blocks, for example, as defined in VVC. In another example, to avoid division operations for DC prediction, only the longer side is used to compute the average for non-square blocks. In addition, the results of intra prediction of planar mode may be further modified by a position dependent intra prediction combination (PDPC) method.

The intra prediction unit 254 is configured to use reconstructed samples of neighboring blocks of the same current picture to generate an intra prediction block 265 according to an intra prediction mode in the set of intra prediction modes.

The intra prediction unit 254 (or in general, the mode selection unit 260) is further configured to output intra prediction parameters (or in general, information indicative of the selected intra prediction mode for the block) to the entropy encoding unit 270 in form of syntactic elements 266 for inclusion into the encoded picture data 21, so that, for example, the video decoder 30 may receive and use the prediction parameters for decoding.

The intra prediction modes in the HEVC include a direct current prediction mode, a planar prediction mode, and 33 angle prediction modes, and there are 35 candidate prediction modes in total. FIG. 3 is a schematic diagram of an HEVC intra prediction direction. As shown in FIG. 3, a current block may use pixels of a reconstructed picture block on a left side and an upper side as references to perform intra prediction. A picture block that is in a surrounding region of the current block and that is for performing intra prediction on the current block is a reference block, and a pixel in the reference block is referred to as a reference pixel. In the 35 candidate prediction modes, the direct current prediction mode is applicable to a region with a flat texture in the current block, and all pixels in the region use an average value of reference pixels in a reference block as a prediction; the planar prediction mode is applicable to a picture block with a smooth texture change, and a current block that meets the condition uses reference pixels in the reference block to perform bilinear interpolation as a prediction of all pixels in the current block; and in the angle prediction modes, a value of a reference pixel in a corresponding reference block is copied along an angle by using a feature that a texture of the current block is related to a texture height of an adjacent reconstructed picture block, and is used as a prediction of all pixels in the current block.

Figure 3:
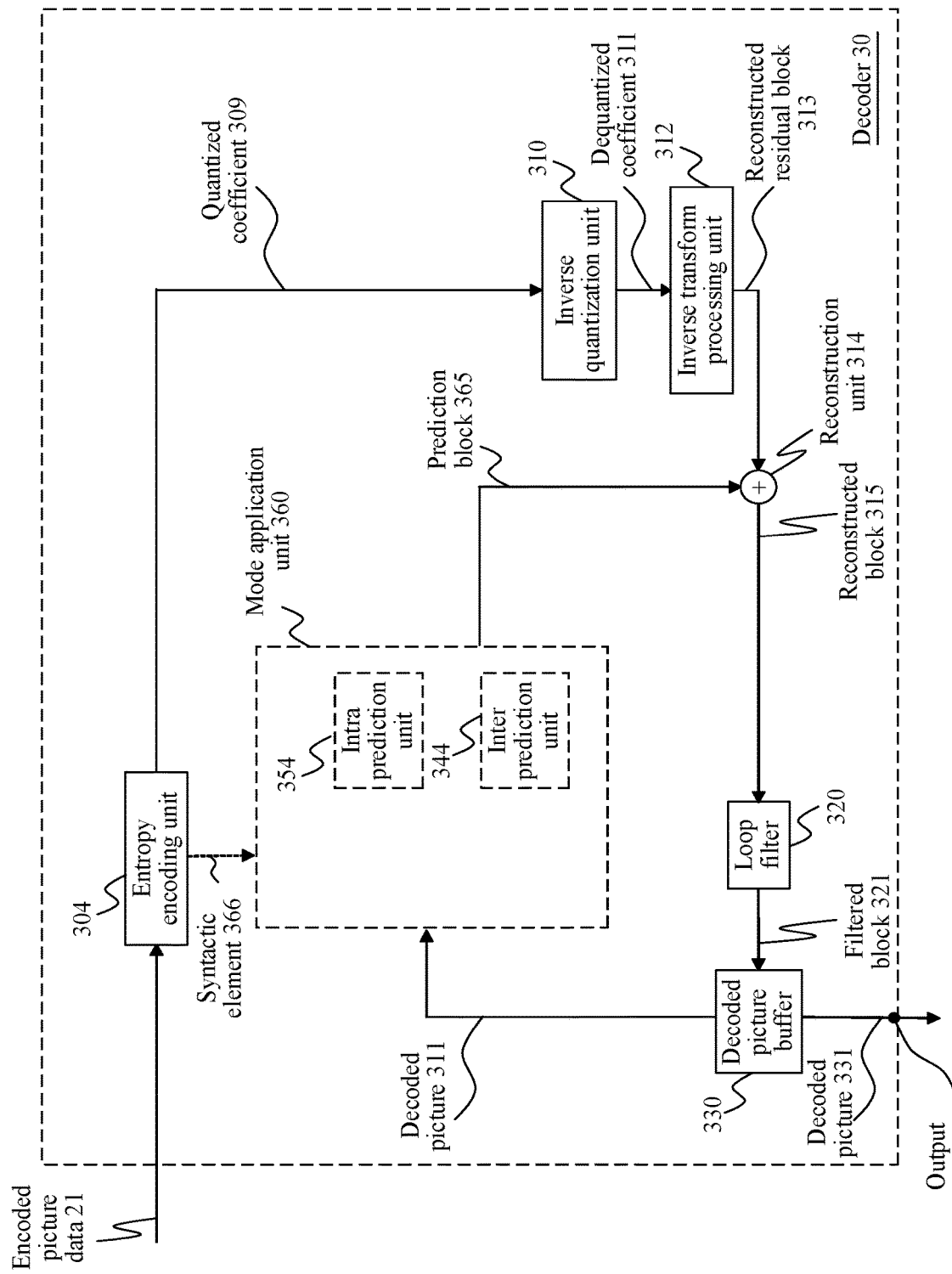
FIG. 3 is an example block diagram of a video decoder 30 according to an embodiment of this application.

The HEVC encoder selects an optimal intra prediction mode for the current block from the 35 candidate prediction modes shown in FIG. 3, and writes the optimal intra prediction mode into a video bitstream. To improve the coding efficiency of intra prediction, the encoder/decoder derives three most probable modes from the respective optimal intra prediction modes of the reconstructed picture blocks using intra prediction in the surrounding region. If the optimal intra prediction mode selected for the current block is one of the three most probable modes, a first index is encoded to indicate that the selected optimal intra prediction mode is one of the three most probable modes. If the selected optimal intra prediction mode is not the three most probable modes, a second index is encoded to indicate that the selected optimal intra prediction mode is one of the remaining 32 modes (other modes except the foregoing three most probable modes in the 35 candidate prediction modes). In the HEVC standard, a 5-bit fixed-length code is used as the second index.

A method for the HEVC encoder to derive the three most possible modes includes: selecting an optimal intra prediction mode of a left adjacent picture block of a current block and an optimal intra prediction mode of an upper adjacent picture block of the current block into a set, and if the two optimal intra prediction modes are the same, reserving only one of the two optimal intra prediction modes in the set. If the two optimal intra prediction modes are the same and both are angle prediction modes, two angle prediction modes adjacent to the angle direction are selected and added to the set; otherwise, the planar prediction mode, the direct current mode, and the vertical prediction mode are selected and added to the set in sequence until a quantity of modes in the set reaches 3.

After performing entropy decoding on the bitstream, the HEVC decoder obtains mode information of the current block. The mode information includes an indication identifier indicating whether the optimal intra prediction mode of the current block is in the three most probable modes, and an index of the optimal intra prediction mode of the current block in the three most probable modes or an index of the optimal intra prediction mode of the current block in the other 32 modes.

Inter Prediction

In a possible implementation, the set of (or possible) inter prediction modes depends on the available reference pictures (that is, previous at least partially decoded pictures, for example, stored in DBP 230) and other inter prediction parameters, for example, whether the whole reference picture or only a part, for example, a search window region around the region of the current block, of the reference picture is used for searching for a best matching reference block, and/or for example, whether pixel interpolation is applied, for example, half/semi-pel, quarter-pel and/or 1/16 pel interpolation, or not.

Additional to the above prediction modes, a skip mode, a direct mode, and/or another inter prediction mode may be applied.

For example, for extended merge prediction, the merge candidate list of such a mode is constructed by including the following five types of candidates in order: spatial motion vector prediction (MVP) from spatial neighbor CUs, temporal MVP from collocated CUs, history-based MVP from a first-in, first-out (FIFO) table, pairwise average MVP, and zero MVs. The accuracy of the MV of the merge mode is increased through decoder-side intra prediction mode correction (DMVR) based on bilateral matching. The merge mode with motion vector difference (MVD) (MMVD) is derived from the merge mode with intra prediction mode differences. An MMVD flag is signaled right after sending a skip flag and merge flag to specify whether the MMVD mode is used for a CU. A CU-level adaptive intra prediction mode resolution (AMVR) scheme can be used. AMVR allows MVD of the CU to be coded in different precision. Dependent on the prediction mode for the current CU, the MVDs of the current CU may be adaptively selected. When a CU is coded in merge mode, the combined inter/intra prediction (CIIP) mode may be applied to the current CU. Weighted averaging of the inter and intra prediction signals is performed to obtain the CIIP prediction. For affine motion compensation prediction, motion information of two control points (4-parameter) or three control points (6-parameter) in an intra prediction mode describes an affine motion field of a block. The sub-block-based temporal motion vector prediction (SbTMVP) is similar to the temporal intra prediction mode prediction (TMVP) in HEVC, but the intra prediction mode of the sub-CU in the current CU is predicted. Bi-directional optical flow (BDOF), previously referred to as BIO, is a simpler version that requires much less computation, especially in terms of number of multiplications and the size of the multiplier. In the triangle partition mode, a CU is split evenly into two triangle-shaped partitions, using either the diagonal split or the anti-diagonal split. Besides, the bi-prediction mode is extended beyond simple averaging to allow weighted averaging of the two prediction signals.

The inter prediction unit 244 may include a motion estimation (ME) unit and a motion compensation (MC) unit (both not shown in FIG. 2). The motion estimation unit may be configured to receive or obtain the picture block 203 (the current picture block 203 in the current picture 17) and a decoded picture 231, or at least one or a plurality of previously reconstructed blocks, for example, reconstructed blocks of one or a plurality of other/different previously decoded pictures 231, for motion estimation. For example, a video sequence may include the current picture and the previously decoded pictures 231, or in other words, the current picture and the previously decoded pictures 231 may be part of or form a sequence of pictures forming a video sequence.

The encoder 20 may, for example, be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also referred to as an intra prediction mode (motion vector (MV)).

The motion compensation unit is configured to obtain, for example, receive, an inter prediction parameter and perform inter prediction based on or using the inter prediction parameter to obtain an inter prediction block 246. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thereby potentially increasing the quantity of candidate prediction blocks that may be for coding a picture block. Once the intra prediction mode corresponding to the PU of the current picture block is received, the motion compensation unit may locate, in one of the reference picture lists, a prediction block pointed to by the intra prediction mode.

The motion compensation unit may also generate syntactic elements associated with the blocks and video slices for use by the video decoder 30 in decoding the picture blocks of the video slice. In addition or as an alternative to slices and respective syntactic elements, tile groups and/or tiles and respective syntactic elements may be generated or used.

Entropy Coding

The entropy encoding unit 270 is configured to apply, for example, an entropy encoding algorithm or scheme (for example, a variable length coding (VLC) scheme, a context adaptive VLC scheme (CAVLC), an arithmetic coding scheme, a binarization algorithm, context adaptive binary arithmetic coding (CABAC), syntax-based context-adaptive binary arithmetic coding (SBAC), probability interval partitioning entropy (PIPE) coding, or another entropy encoding methodology or technique) to the quantized coefficients 209, inter prediction parameters, intra prediction parameters, loop filter parameters, and/or other syntactic elements to obtain encoded picture data 21 that can be output via the output end 272, for example, in the form of an encoded bitstream 21, so that, for example, the video decoder 30 may receive and use the parameters for decoding. The encoded bitstream 21 may be transmitted to the video decoder 30, or stored in a memory for later transmission or retrieval by the video decoder 30.

Other structural variations of the video encoder 20 can be used to encode the video stream. For example, a non-transform based encoder 20 may quantize a residual signal directly without the transform processing unit 206 for some blocks or frames. In another implementation, an encoder 20 can have the quantization unit 208 and the inverse quantization unit 210 combined into a single unit.

Decoder and Decoding Method

FIG. 3 is an example block diagram of a video decoder 30 according to an embodiment of this application. The video decoder 30 is configured to receive encoded picture data 21 (for example, an encoded bitstream 21), for example, encoded by the encoder 20, to obtain a decoded picture 331. The encoded picture data or bitstream includes information for decoding the encoded picture data, for example, data that represents picture blocks of an encoded video slice (and/or tile groups or tiles) and associated syntactic elements.

In the example of FIG. 3, the decoder 30 includes an entropy decoding unit 304, an inverse quantization unit 310, an inverse transform processing unit 312, a reconstruction unit 314 (for example, a summer 314), a loop filter 320, a DBP 330, a mode application unit 360, an inter prediction unit 344 and an intra prediction unit 354. Inter prediction unit 344 may be or include a motion compensation unit. The video decoder 30 may, in some examples, perform a decoding pass generally reciprocal to the encoding pass described with respect to the video encoder 100 in FIG. 2.

Referring to FIG. 3, the intra prediction unit includes a trained target model (also referred to as a neural network). The neural network is configured to process an input picture, picture region, or picture block, to generate a predicted value of the input picture block. For example, the neural network for intra prediction is configured to receive an input picture, picture region, or picture block, and generate a predicted value of the input picture, picture region, or picture block. The following describes in detail a neural network for intra prediction with reference to FIG. 6A to FIG. 6E.

As explained with regard to the encoder 20, the inverse quantization unit 210, the inverse transform processing unit 212, the reconstruction unit 214, the loop filter 220, the decoded picture buffer DPB 230, the inter prediction unit 344 and the intra prediction unit 354 also form the "built-in decoder" of the video encoder 20. Accordingly, the inverse quantization unit 310 may be identical in function to the inverse quantization unit 110, the inverse transform processing unit 312 may be identical in function to the inverse transform processing unit 122, the reconstruction unit 314 may be identical in function to the reconstruction unit 214, the loop filter 320 may be identical in function to the loop filter 220, and the decoded picture buffer 330 may be identical in function to the decoded picture buffer 230. Therefore, the explanations provided for the respective units and functions of the video encoder 20 apply correspondingly to the respective units and functions of the video decoder 30.

Entropy Decoding

The entropy decoding unit 304 is configured to parse the bitstream 21 (or in general the encoded picture data 21) and perform, for example, entropy decoding on the encoded picture data 21 to obtain, for example, quantized coefficients 309 and/or decoded coding parameters (not shown in FIG. 3), for example, any or all of inter prediction parameters (for example, the reference picture index and the intra prediction mode), intra prediction parameters (for example, the intra prediction mode or the index), transform parameters, quantization parameters, loop filter parameters, and/or other syntactic elements. The entropy decoding unit 304 may be configured to apply the decoding algorithms or schemes corresponding to the encoding schemes as described with regard to the entropy encoding unit 270 of the encoder 20. The entropy decoding unit 304 may be further configured to provide inter prediction parameters, intra prediction parameters, and/or other syntactic elements to the mode application unit 360 and other parameters to other units of the decoder 30. The video decoder 30 may receive the syntactic elements at the video slice level and/or the video block level. In addition or as an alternative to slices and respective syntactic elements, tile groups and/or tiles and respective syntactic elements may be received and/or used.

Inverse Quantization

The inverse quantization unit 310 may be configured to receive quantization parameters (QP) (or in general information related to the inverse quantization) and quantized coefficients from the encoded picture data 21 (for example, by parsing and/or decoding, for example, by the entropy decoding unit 304) and apply, based on the quantization parameters, an inverse quantization to the decoded quantized coefficients 309 to obtain dequantized coefficients 311. The dequantized coefficients 311 may also be referred to as transform coefficients 311. The inverse quantization process may include use of a quantization parameter determined by the video encoder 20 for each video block in the video slice (or a tile or tile group) to determine a degree of quantization and, likewise, a degree of inverse quantization that should be applied.

Inverse Transform

The inverse transform processing unit 312 may be configured to receive dequantized coefficients 311, also referred to as transform coefficients 311, and apply a transform to the dequantized coefficients 311, to obtain reconstructed residual blocks 213 in the sample domain. The reconstructed residual block 213 may also be referred to as a transform block 313. The transform may be an inverse transform, for example, an inverse DCT, an inverse DST, an inverse integer transform, or a conceptually similar inverse transform process. The inverse transform processing unit 312 may be further configured to receive transform parameters or corresponding information from the encoded picture data 21 (for example, by parsing and/or decoding, for example, by the entropy decoding unit 304) to determine the transform to be applied to the dequantized coefficients 311.

Reconstruction

The reconstruction unit 314 (for example, an adder or a summer 314) is configured to add the reconstructed residual block 313 to the prediction block 365 to obtain a reconstructed block 315 in the sample domain, for example, by adding, sample by sample, the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, for example, to smooth pixel transitions, or otherwise improve the video quality. The loop filter unit 320 may include one or more loop filters such as a de-blocking filter, a SAO filter or one or more other filters, for example, an ALF, a noise suppression filter (NSF), or any combination thereof. In an example, the loop filter unit 220 may include a de-blocking filter, a SAO, filter and an ALF filter. The order of the filtering process may be the deblocking filter, SAO, and ALF. In another example, a process referred to as the LMCS (namely, the adaptive in-loop reshaper) is added. This process is performed before deblocking. In another example, the deblocking filter process may be also applied to internal sub-block edges, for example, affine sub-block edges, ATMVP sub-block edges, sub-block transform (SBT) edges and intra sub-partition (ISP) edges. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in the decoded picture buffer 330. The decoded picture buffer 330 stores the decoded pictures 331 as reference pictures for subsequent motion compensation for other pictures and/or for output respectively display.

The decoder 30 is configured to output the decoded picture 311, for example, via an output end 312, for presentation or viewing to a user.

Prediction

The inter prediction unit 344 may be identical to the inter prediction unit 244 (in particular to the motion compensation unit), and the intra prediction unit 354 may be identical to the inter prediction unit 254 in function, and performs split or partitioning decisions and prediction based on the partitioning and/or prediction parameters or respective information received from the encoded picture data 21 (for example, by parsing and/or decoding, for example, by the entropy decoding unit 304). The mode application unit 360 may be configured to perform the prediction (intra or inter prediction) per block based on reconstructed pictures, reconstructed blocks, or corresponding samples (filtered or unfiltered) to obtain the prediction block 365.

When the video slice is coded as an intra coded (I) slice, the intra prediction unit 354 of the mode application unit 360 is configured to generate a prediction block 365 for a picture block of the current video slice based on a signaled intra prediction mode and data from previously decoded blocks of the current picture. When the video picture is coded as an inter coded (that is, B or P) slice, the inter prediction unit 344 (for example, the motion compensation unit) of the mode application unit 360 is configured to generate a prediction block 365 for the video block of the current video slice abased on the intra prediction mode and other syntactic elements received from the entropy decoding unit 304. For inter prediction, the prediction blocks may be produced from one of the reference pictures within one of the reference picture lists. Video decoder 30 may construct the reference frame lists, a list 0 and a list 1, using default construction techniques based on reference pictures stored in the DPB 330. The same or similar may be applied for or by embodiments using tile groups (for example, video tile groups) and/or tiles (for example, video tiles) in addition or alternatively to slices (for example, video slices), for example, a video may be coded using I, P, or B tile groups and/or tiles.

The mode application unit 360 is configured to determine prediction information for a video block of the current video slice by parsing the intra prediction mode and other syntactic elements, and use the prediction information to produce the prediction block for the current video block being decoded. For example, the mode application unit 360 uses some of the received syntactic elements to determine a prediction mode (for example, intra or inter prediction) for coding the video blocks of the video slice, an inter prediction slice type (for example, a B slice, a P slice, or a generalized P/B (GPB) slice), construction information for one or more of the reference picture lists for the slice, an intra prediction mode for each inter encoded video block of the slice, an inter prediction status for each inter coded video block of the slice, and other information to decode the video blocks in the current video slice. The same or similar may be applied for or by embodiments using tile groups (for example, video tile groups) and/or tiles (for example, video tiles) in addition or alternatively to slices (for example, video slices), for example, a video may be coded using I, P, or B tile groups and/or tiles.

In an embodiment, the video decoder 30 in FIG. 3 may be further configured to partition and/or decode the picture by using slices (also referred to as video slices). A picture may be partitioned into or decoded using one or more slices (typically non-overlapping). Each slice may include one or more blocks (for example, CTUs) or one or more groups of blocks (for example, tiles in the H.265/HEVC/VVC standard or bricks in the VVC standard).

In an embodiment, the video decoder 30 shown in FIG. 3 may be further configured to partition and/or decode the picture by using slices/tile groups (also referred to as video tile groups) and/or tiles (also referred to as video tiles). A picture may be partitioned into or decoded using one or more slices/tile groups (typically non-overlapping), and each slice/tile group may include, for example, one or more blocks (for example, CTUs) or one or more tiles. Each tile, for example, may be of rectangular shape and may include one or more blocks (for example, CTUs), for example, complete or fractional blocks.

Other variations of the video decoder 30 can decode the encoded picture data 21. For example, the decoder 30 can generate an output video stream without the loop filter unit 320. For example, a non-transform based decoder 30 may dequantize a residual signal directly without the inverse transform processing unit 312 for some blocks or frames. In another implementation, the video decoder 30 can have the inverse quantization unit 310 and the inverse transform processing unit 312 combined into a single unit.

It should be understood that, in the encoder 20 and the decoder 30, a processing result of a current step may be further processed and then output to the next step. For example, after interpolation filtering, intra prediction mode derivation, or loop filtering, a further operation, such as a clip or shift operation, may be performed on a processing result of the interpolation filtering, intra prediction mode derivation, or loop filtering.

Notably, a further operation may be applied to the derived intra prediction mode of the current block (including, but not limited to, a control point intra prediction mode in an affine mode, a sub-block intra prediction mode in an affine, a planar, or an ATMVP mode, a time intra prediction mode, and the like). For example, the value of the intra prediction mode is limited to a predefined range according to the representation bit of the intra prediction mode. If the representation bit of the intra prediction mode is bitDepth, the range is from $-2^{(bitDepth-1)}$ to $2^{(bitDepth-1)}-1$, where "^" represents the power. For example, if bitDepth is set to 16, the range is −32768 to 32767; if bitDepth is set to 18, the range is −131072 to 131071. For example, the derived value of the intra prediction mode (for example, MVs of four 4×4 sub-blocks within one 8×8 block) is limited, such that a maximum difference between integer parts of the MVs of the four 4×4 sub-blocks is no more than N pixels, such as no more than 1 pixel. Two methods for limiting the intra prediction mode based on bitDepth are provided.

Although video coding is mainly described in the foregoing embodiments, notably, embodiments of the coding system 10, the encoder 20, and the decoder 30, and other embodiments described herein may also be configured for still picture processing or coding, that is, the processing or coding of an individual picture independent of any preceding or consecutive picture as in video coding. In general, the inter prediction unit 244 (encoder) and the inter prediction unit 344 (decoder) may not be available in case the picture processing coding is limited to only a single picture 17. All other functionalities (also referred to as tools or technologies) of the video encoder 20 and the video decoder 30 may equally be used for still picture processing, for example, residual calculation 204/304, transform 206, quantization 208, inverse quantization 210/310, (inverse) transform 212/312, partitioning 262/362, intra prediction 254/354, and/or loop filtering 220/320, and entropy encoding 270 and entropy decoding 304.

Figure 4:
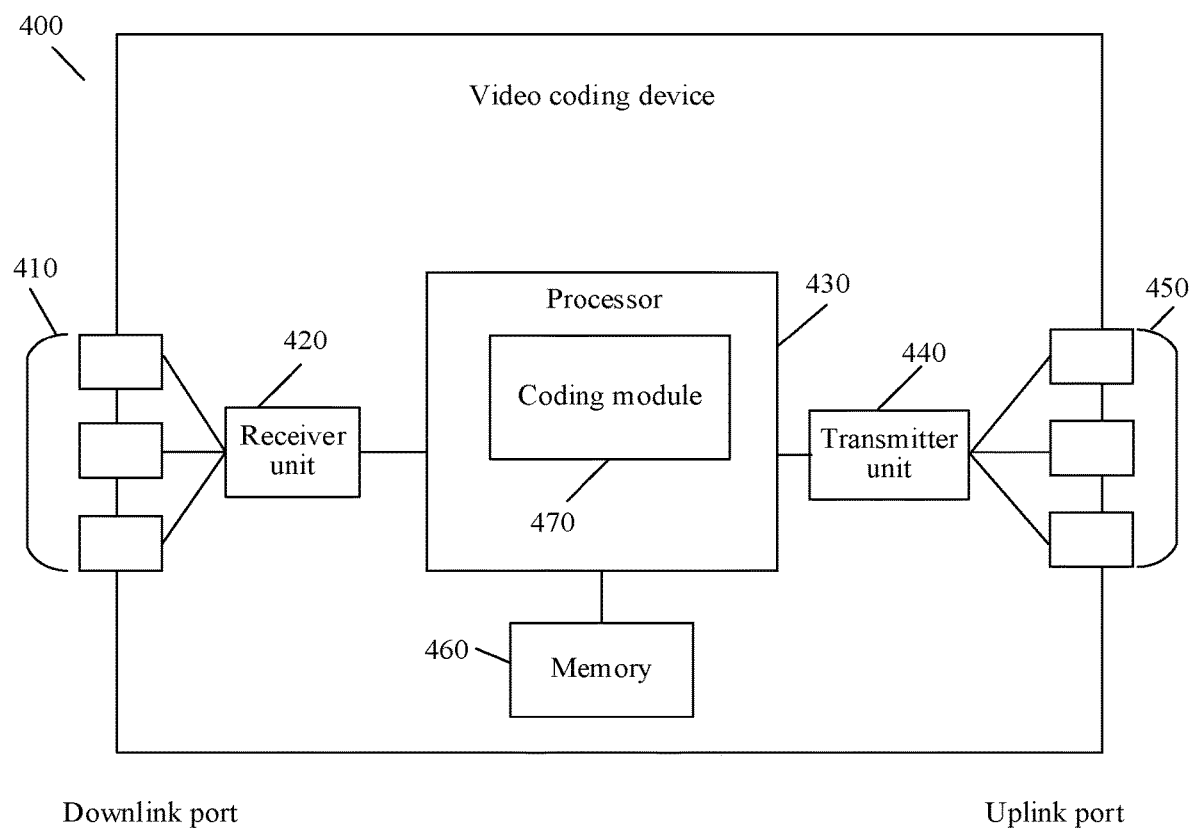
FIG. 4 is an example block diagram of a video coding device 400 according to an embodiment of this application.

FIG. 4 is an example block diagram of a video coding device 400 according to an embodiment of this application. The video coding device 400 is suitable for implementing the disclosed embodiments as described herein. In an embodiment, the video coding device 400 may be a decoder such as the video decoder 30 of FIG. 1A or an encoder such as the video encoder 20 of FIG. 1A.

The video coding device 400 includes ingress ports 410 (or input ports 410) and receiver units (receiver unit, Rx) 420 for receiving data; a processor, a logic unit, or a central processing unit (CPU) 430 for processing the data, for example, the processor 430 may be a neural network processing unit 430; transmitter units (transmitter unit, Tx) 440 and egress ports 450 (or output ports 450) for transmitting the data; and a memory 460 for storing the data. The video coding device 400 may further include optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more processor chips, cores (for example, a multi-core processor), FPGAs, ASICs, and DSPs. The processor 430 is in communication with the ingress ports 410, receiver units 420, transmitter units 440, egress ports 450, and the memory 460. The processor 430 includes a coding module 470 (for example, a neural network-based coding module 470). The coding module 470 implements the disclosed embodiments described above. For instance, the coding module 470 implements, processes, prepares, or provides the various coding operations. Therefore, inclusion of the coding module 470 provides a substantial improvement to functions of the video coding device 400 and affects a switching of the video coding device 400 to a different state. Alternatively, the coding module 470 is implemented as instructions stored in the memory 460 and executed by the processor 430.

The memory 460 may include one or more disks, tape drives, and solid-state drives and may be used as an overflow data storage device, to store programs when such programs are selected for execution, and store instructions and data that are read during program execution. The memory 460 may be volatile and/or non-volatile and may be a read-only memory (ROM), a random-access memory (RAM), a ternary content-addressable memory (TCAM), and/or a SRAM.

FIG. 5 is an example block diagram of an apparatus 500 according to an embodiment of this application. The apparatus 500 may be used as either or both of a source device 12 and a destination device 14 in FIG. 1A.

A processor 502 in the apparatus 500 can be a central processing unit. Alternatively, the processor 502 can be any other type of device, or a plurality of devices, capable of manipulating or processing information now-existing or hereafter developed. Although the disclosed implementations can be practiced with a single processor as shown, for example, the processor 502, advantages in speed and efficiency can be achieved using more than one processor.

A memory 504 in the apparatus 500 can be a ROM device or a RAM device in an implementation. Any other suitable type of storage device can be used as the memory 504. The memory 504 can include code and data 506 that is accessed by the processor 502 through a bus 512. The memory 504 can further include an operating system 508 and application programs 510. The application programs 510 include at least one program that permits the processor 502 to perform the methods described here. For example, the application programs 510 may include applications 1 through N, which further include a video coding application that performs the methods described here.

The apparatus 500 may further include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 may include a plurality of buses. Further, a secondary storage may be directly coupled to the other components of the apparatus 500 or may be accessed via a network and may include a single integrated unit such as a memory card or a plurality of units such as a plurality of memory cards. Therefore, the apparatus 500 may be implemented in a wide variety of configurations.

Embodiments of this application relate to application of a neural network. For ease of understanding, the following first explains some terms used in embodiments of this application. The terms are also used as a part of contents of the present disclosure.

(1) Neural Network (NN)

A NN is a machine learning model. The neural network may include neurons. The neuron may be an operation unit that uses $x_s$ and an intercept of 1 as inputs, where an output of the operation unit may be as follows:

$$h_{W,b}(x)=f(W^T x)=f(\Sigma_{s=1}^{n} W_s x_s + b) \tag{1-1}$$

s=1, 2, . . . , or n, n is a natural number greater than 1, $W_s$ is a weight of $x_s$, and b is bias of the neuron. If is an activation function of the neuron, used to introduce a non-linear feature into the neural network, to convert an input signal in the neuron into an output signal. The output signal of the activation function may serve as an input of a next convolutional layer. The activation function may be a sigmoid function. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network (DNN)

The DNN is also referred to as a multi-layer neural network, and may be understood as a neural network having a plurality of hidden layers. There is no special metric for "a plurality of" herein. The DNN is divided based on locations of different layers, and a neural network in the DNN may be divided into three types: an input layer, a hidden layer, and an output layer. Generally, the first layer is the input layer, the last layer is the output layer, and the middle layer is the hidden layer. Layers are fully connected. To be specific, any neuron in the $i^{th}$ layer is definitely connected to any neuron in the $(i+1)^{th}$ layer. Although the DNN seems to be complex, the DNN is actually not complex in terms of work at each layer, and is simply expressed as the following linear relationship expression: $\vec{y}\alpha(W\vec{x}+\vec{b})$, where $\vec{x}$ is an input vector, $\vec{y}$ is an output vector, $\vec{b}$ is a bias vector, W is a weight matrix (also referred to as a coefficient), and $\alpha()$ is an activation function. At each layer, the output vector $\vec{y}$ is obtained by performing such a simple operation on the input vector $\vec{x}$. Because there are many layers in the DNN, there are also many coefficients W and bias vectors $\vec{b}$. Definitions of these parameters in the DNN are as follows: The coefficient W is used as an example. It is assumed that in a three-layer DNN, a linear coefficient from the fourth neuron at the second layer to the second neuron at the third layer is defined as $w_{24}^3$. The superscript 3 represents a layer at which the coefficient W is located, and the subscript corresponds to an output third-layer index 2 and an input second-layer index 4. In conclusion, a coefficient from the $k^{th}$ neuron at the $(L-1)^{th}$ layer to the $j^{th}$ neuron at the $L^{th}$ layer is defined as $W_{jk}^L$. Notably, there is no parameter W at the input layer. In the deep neural network, more hidden layers make the network more capable of describing a complex case in the real world. Theoretically, a model with more parameters has higher complexity and a larger "capacity". It indicates that the model can complete a more complex learning task. Training the deep neural network is a process of learning a weight matrix, and a final objective of the training is to obtain a weight matrix of all layers of the trained deep neural network (a weight matrix formed by vectors W at many layers).

(3) Convolutional Neural Network (CNN)

The CNN is a deep neural network with a convolutional structure, and is a deep learning architecture. In the deep learning architecture, multi-layer learning is performed at different abstract levels according to a machine learning algorithm. As a deep learning architecture, the CNN is a feed-forward artificial neural network. Neurons in the feed-forward artificial neural network may respond to an input picture. The convolutional neural network includes a feature extractor constituted by a convolutional layer and a pooling layer. The feature extractor may be considered as a filter. A convolution process may be considered as using a trainable filter to perform convolution on an input picture or a convolutional feature plane (feature map).

The convolutional layer is a neuron layer that is in the convolutional neural network and at which convolution processing is performed on an input signal. The convolutional layer may include a plurality of convolution operators. The convolution operator is also referred to as a kernel. In picture processing, the convolution operator functions as a filter that extracts specific information from an input picture matrix. The convolution operator may essentially be a weight matrix, and the weight matrix is usually predefined. In a process of performing a convolution operation on a picture, the weight matrix is usually used to process pixels at a granularity level of one pixel (or two pixels, depending on a value of a stride) in a horizontal direction on the input picture, to extract a specific feature from the picture. A size of the weight matrix should be related to a size of the picture. Notably, a depth dimension of the weight matrix is the same as a depth dimension of the input picture. During a convolution operation, the weight matrix extends to an entire depth of the input picture. Therefore, convolution with a single weight matrix generates convolution output of a single depth dimension. However, in most cases, the single weight matrix is not used, but instead, a plurality of weight matrices of a same size (rows×columns), namely, a plurality of homogeneous matrices, are used. Outputs of the weight matrices are stacked to form a depth dimension of a convolutional picture. The dimension herein may be understood as being determined based on the foregoing "plurality". Different weight matrices may be used to extract different features from the picture. For example, one weight matrix is for extracting edge information of the picture, another weight matrix is for extracting a specific color of the picture, and still another weight matrix is for blurring unnecessary noise in the picture. Sizes of the plurality of weight matrices (rows×columns) are the same. Sizes of feature maps extracted from the plurality of weight matrices with the same size are also the same, and then the plurality of extracted feature maps with the same size are combined to form an output of the convolution operation. Weight values in these weight matrices need to be obtained through a large amount of training in actual application. Each weight matrix including weight values obtained through training may be for extracting information from an input picture, so that the convolutional neural network performs correct prediction. When the convolutional neural network has a plurality of convolutional layers, a large quantity of general features are usually extracted at an initial convolutional layer. The general feature may also be referred to as a low-level feature. As a depth of the convolutional neural network increases, a feature extracted at a subsequent convolutional layer is more complex, for example, a high-level semantic feature. A feature with higher-level semantics is more applicable to a to-be-resolved problem.

A quantity of training parameters often needs to be reduced. Therefore, a pooling layer often needs to be periodically introduced after a convolutional layer. One convolutional layer may be followed by one pooling layer, or a plurality of convolutional layers may be followed by one or more pooling layers. During picture processing, the pooling layer is only for reducing a space size of the picture. The pooling layer may include an average pooling operator and/or a maximum pooling operator, to perform sampling on the input picture to obtain a picture with a small size. The average pooling operator may be for calculating pixel values in the picture in a specific range, to generate an average value. The average value is used as an average pooling result. The maximum pooling operator may be for selecting a pixel with a maximum value in a specific range as a maximum pooling result. In addition, similar to that the size of the weight matrix at the convolutional layer needs to be related to the size of the picture, an operator at the pooling layer also needs to be related to the size of the picture. A size of a processed picture output from the pooling layer may be less than a size of a picture input to the pooling layer. Each sample in the picture output from the pooling layer represents an average value or a maximum value of a corresponding sub-region of the picture input to the pooling layer.

After processing performed at the convolutional layer/pooling layer, the convolutional neural network is not ready to output required output information, because as described above, at the convolutional layer/pooling layer, only a feature is extracted, and parameters resulting from the input picture are reduced. However, to generate final output information (required class information or other related information), the convolutional neural network needs to use the neural network layer to generate an output of one required type or a group of required types. Therefore, the convolutional neural network layer may include a plurality of hidden layers. Parameters included in the plurality of hidden layers may be obtained through pre-training based on related training data of a specific task type. For example, the task type may include picture recognition, picture classification, and super-resolution picture reconstruction.

Optionally, at the neural network layer, the plurality of hidden layers are followed by the output layer of the entire convolutional neural network. The output layer has a loss function similar to a categorical cross entropy, and the loss function is specifically used to calculate a prediction error. Once forward propagation of the entire convolutional neural network is completed, reverse propagation is started to update a weight value and a deviation of each layer mentioned above, to reduce a loss of the convolutional neural network and an error between a result output by the convolutional neural network by using the output layer and an ideal result.

(4) Recurrent Neural Network (RNN)

A RNN processes sequence data. A conventional neural network model starts from an input layer to a hidden layer and then to an output layer, and the layers are fully connected, while nodes in each layer are unconnected. Although this ordinary neural network resolves many problems, it is still incompetent to many problems. For example, if it is expected to predict a next word in a sentence, a preceding word usually needs to be used, because words in a sentence are not independent. A reason why the RNN is referred to as the recurrent neural network is that a current output of a sequence is also related to a previous output of the sequence. A specific representation form is that the network memorizes previous information and applies the previous information to calculation of the current output. To be specific, nodes at the hidden layer are connected, and an input of the hidden layer not only includes an output of the input layer, but also includes an output of the hidden layer at a previous moment. Theoretically, the RNN can process sequence data of any length. Training of the RNN is the same as training of the conventional CNN or DNN. An error back propagation algorithm is also used, but there is a difference: If the RNN is expanded, a parameter such as W of the RNN is shared. This is different from the conventional neural network described in the foregoing example. In addition, during use of a gradient descent algorithm, an output in each step depends not only on a network in a current step, but also on a network status in several previous steps. The learning algorithm is referred to as a back propagation through time (BPTT) algorithm.

Why is the recurrent neural network still required when the convolutional neural network is available? A reason is simple. In the convolutional neural network, there is a premise that elements are independent of each other, and input and output are also independent, such as a cat and a dog. However, in the real world, a plurality of elements is interconnected. For example, the stock changes with time. For another example, a person says "I like traveling, and the most favorite place is Yunnan. In the future, when there is a chance, I will go to (_____). People should know that the person will go to "Yunnan". Because people perform inference from the context. However, how do machines do that? Then, the RNN emerges. The RNN is intended to make the machine capable of memorizing like a human. Therefore, an output of the RNN needs to depend on current input information and historical memorized information.

(5) Loss Function

In a process of training the deep neural network, because it is expected that an output of the deep neural network is as much as possible close to a predicted value that is actually expected, a predicted value of a current network and a target value that is actually expected may be compared, and then, a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between the predicted value and the target value" needs to be predefined. This is a loss function or an objective function. The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible.

(6) Back Propagation (BP) Algorithm

The convolutional neural network may correct a value of a parameter in an initial super-resolution model in a training process according to an error BP algorithm, so that an error loss of reconstructing the super-resolution model becomes smaller. Further, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain a parameter, such as a weight matrix, of an optimal super-resolution model.

(7) Generative Adversarial Network (GAN)

GAN is a deep learning model. The model includes at least two modules: one module is a generative model, and the other module is a discrimination model. Mutual gaming learning is performed through the two modules, to generate a better output. Both the generative model and the discriminative model may be neural networks, and may specifically be deep neural networks or convolutional neural networks. A basic principle of the GAN is as follows: Using a GAN for generating an image as an example, it is assumed that there are two networks: G (Generator) and D (Discriminator). G is a network for generating an image. G receives random noise z, and generates the image by using the noise, where the image is denoted as G(z). D is a discriminator network used to determine whether an image is "real". An input parameter of D is x, x represents an image, and an output D(x) represents a probability that x is a real image. If a value of D(x) is 1, it indicates that the image is 100% real. If the value of D(x) is 0, it indicates that the image cannot be real. In a process of training the generative adversarial network, an objective of the generative network G is to generate an image that is as real as possible to deceive the discriminative network D, and an objective of the discriminative network D is to distinguish between the image generated by G and a real image as much as possible. In this way, a dynamic "gaming" process, to be specific, "adversary" in the "generative adversarial network", exists between G and D. A final gaming result is that in an ideal state, G may generate an image G(z) that is to be difficultly distinguished from a real image, and it is difficult for D to determine whether the image generated by G is real, to be specific, D(G(z))=0.5. In this way, an excellent generative model G is obtained, and can be used to generate an image.

The following describes a target model (also referred to as a neural network) for intra prediction in detail with reference to FIG. 6A to FIG. 6E. FIG. 6A to FIG. 6E show several example architectures of a neural network for intra prediction according to an embodiment of this application.

Figure 6A:
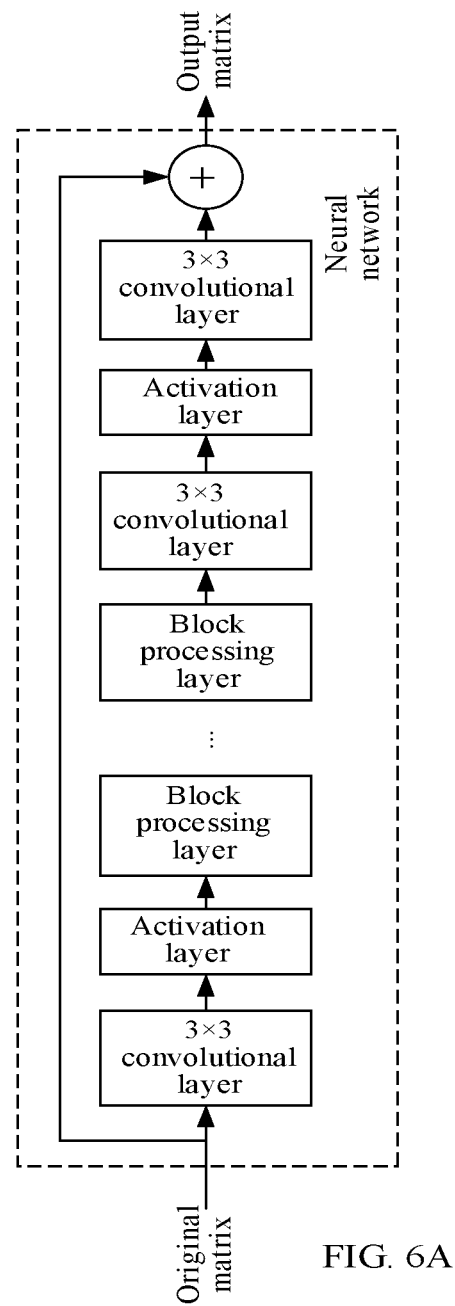
FIG. 6A to FIG. 6E show several example architectures of a neural network for intra prediction according to an embodiment of this application.

As shown in FIG. 6A, the neural network sequentially includes: a 3×3 convolutional layer (3×3Conv), an activation layer (Relu), a block processing layer (Res-Block), . . . , a block processing layer, a 3×3 convolutional layer, an activation layer, and a 3×3 convolutional layer based on a processing sequence. The matrix obtained after an original matrix of the input neural network is processed by the foregoing layers is added to the original matrix, to obtain a final output matrix.

Figure 6B:
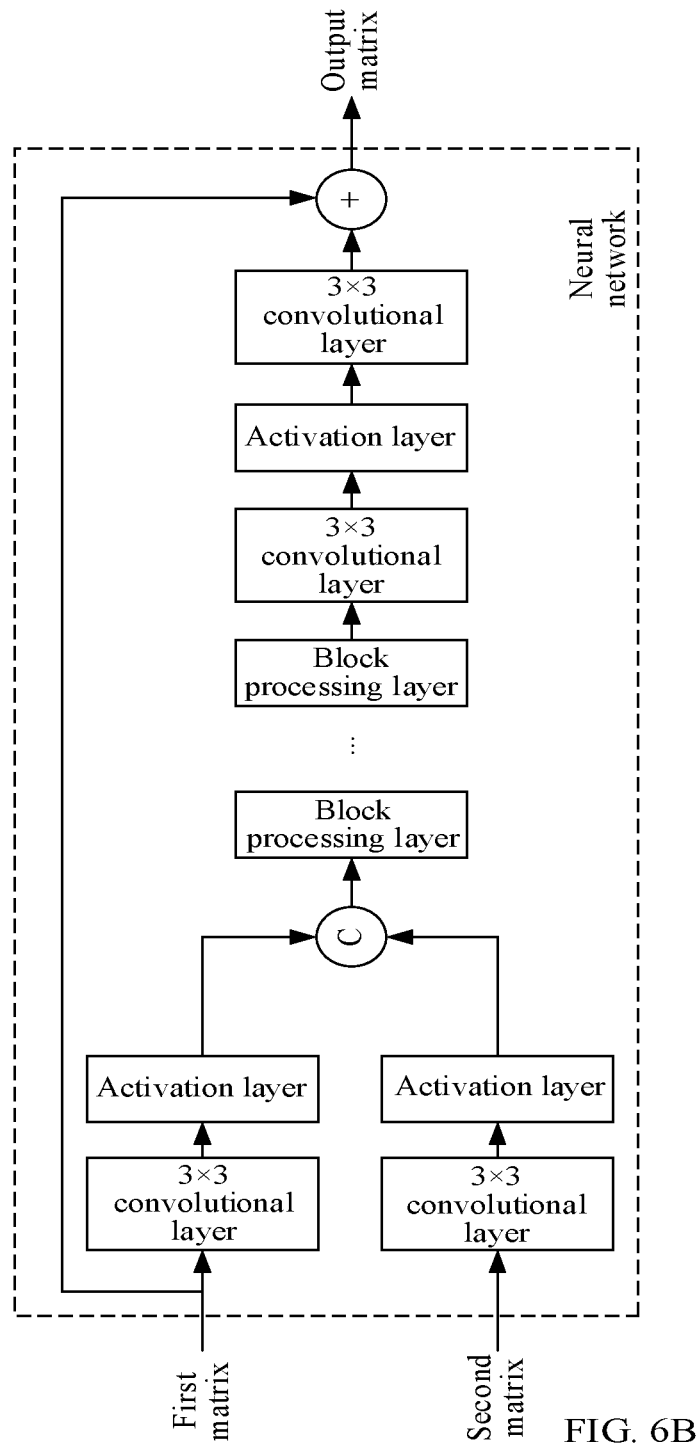

As shown in FIG. 6B, the neural network sequentially includes: two 3×3 convolutional layers and an activation layer, one block processing layer, . . . , a block processing layer, a 3×3 convolutional layer, an activation layer, and a 3×3 convolutional layer based on a processing sequence. The first matrix passes through a 3×3 convolutional layer and the activation layer, and the second matrix passes through the other 3×3 convolutional layer and the activation layer. The processed two matrices are combined (contact), then, are processed by the block processing layer, . . . , the block processing layer, the 3×3 convolutional layer, the activation layer, and the 3×3 convolutional layer, and are further added to the first matrix, to obtain a final output matrix.

Figure 6C:
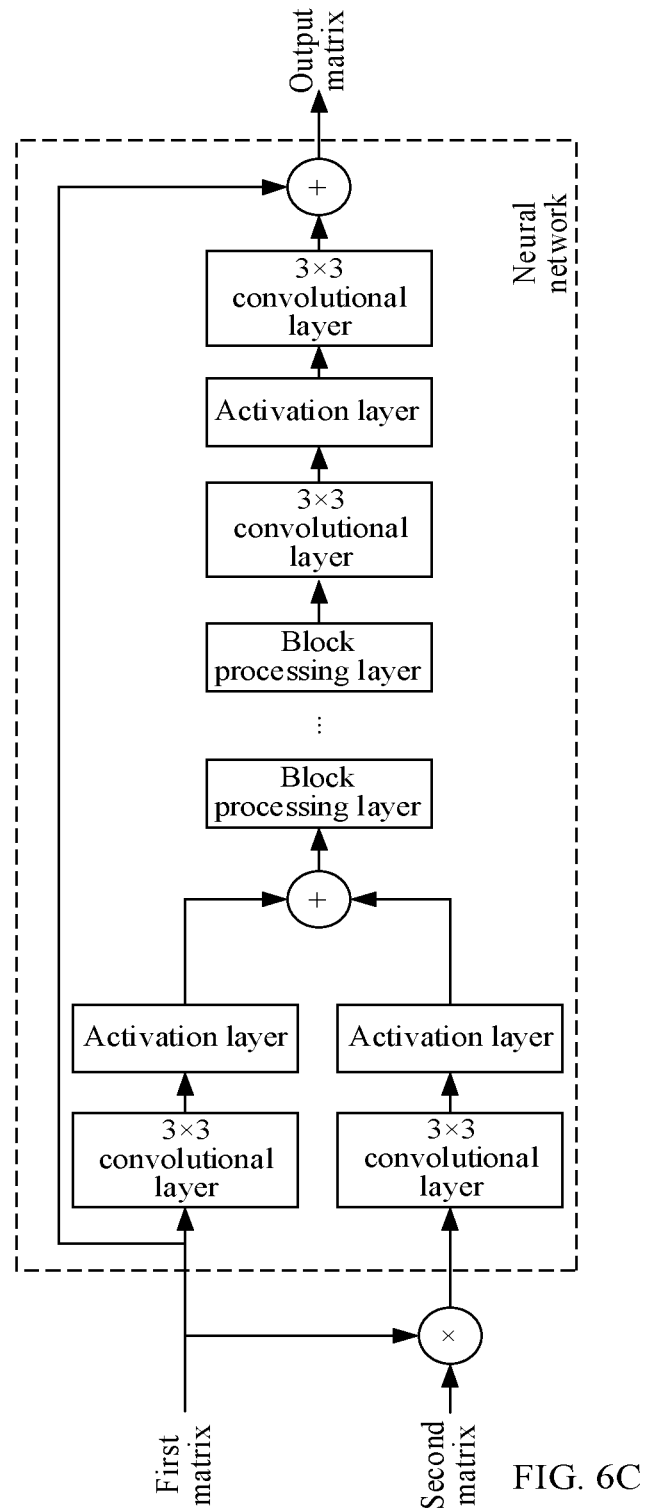

As shown in FIG. 6C, the neural network sequentially includes: two 3×3 convolutional layers and an activation layer, one block processing layer, . . . , a block processing layer, a 3×3 convolutional layer, an activation layer, and a 3×3 convolutional layer based on a processing sequence. Before the first matrix and the second matrix are input into the neural network, the first matrix is multiplied by the second matrix, and then the first matrix passes through a 3×3 convolutional layer and the activation layer, and the matrix obtained after multiplication passes through the other 3×3 convolutional layer and the activation layer. After the two processed matrices are added, the two matrices are processed by the block processing layer, . . . , the block processing layer, the 3×3 convolutional layer, the activation layer, and the 3×3 convolutional layer, and then, are added to the first matrix, to obtain a final output matrix.

Figure 6D:
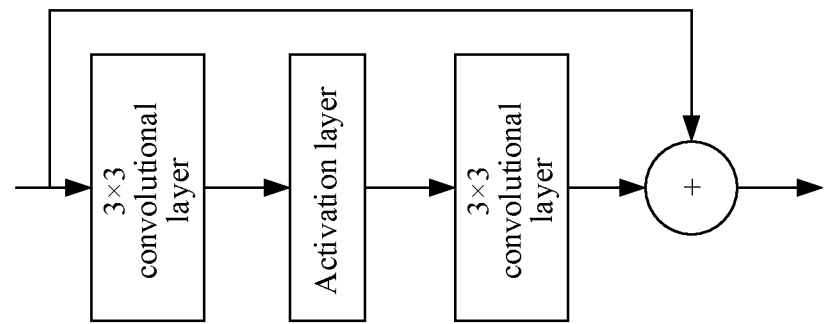
Figure 6E:
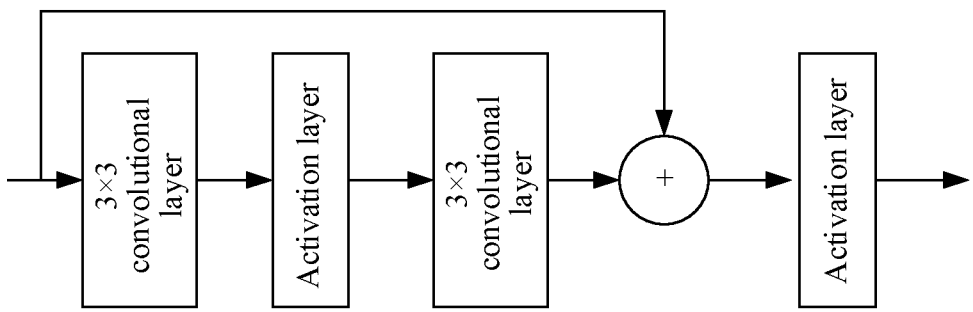

As shown in FIG. 6D, the block processing layer sequentially includes a 3×3 convolutional layer, an activation layer, and a 3×3 convolutional layer based on a processing sequence. After an input matrix is processed by the three layers, a matrix obtained after the processing is added to the initial input matrix, to obtain an output matrix. As shown in FIG. 6C, the block processing layer sequentially includes a 3×3 convolutional layer, an activation layer, a 3×3 convolutional layer, and an activation layer based on a processing sequence. After an input matrix is processed by the 3×3 convolutional layer, the activation layer, and the 3×3 convolutional layer, a matrix obtained after the processing is added to the initial input matrix, and then, the sum is processed by an activation layer, to obtain an output matrix.

Notably, FIG. 6A to FIG. 6E show only several example architectures of the neural network for intra prediction in embodiments of this application, and do not constitute a limitation on the architecture of the neural network. A quantity of layers, a layer structure, and processing, such as addition, multiplication, or combination, included in the neural network, and a quantity, sizes, and the like of input and/or output matrices may be determined based on an actual status. These are not specifically limited in this application.

Figure 7:
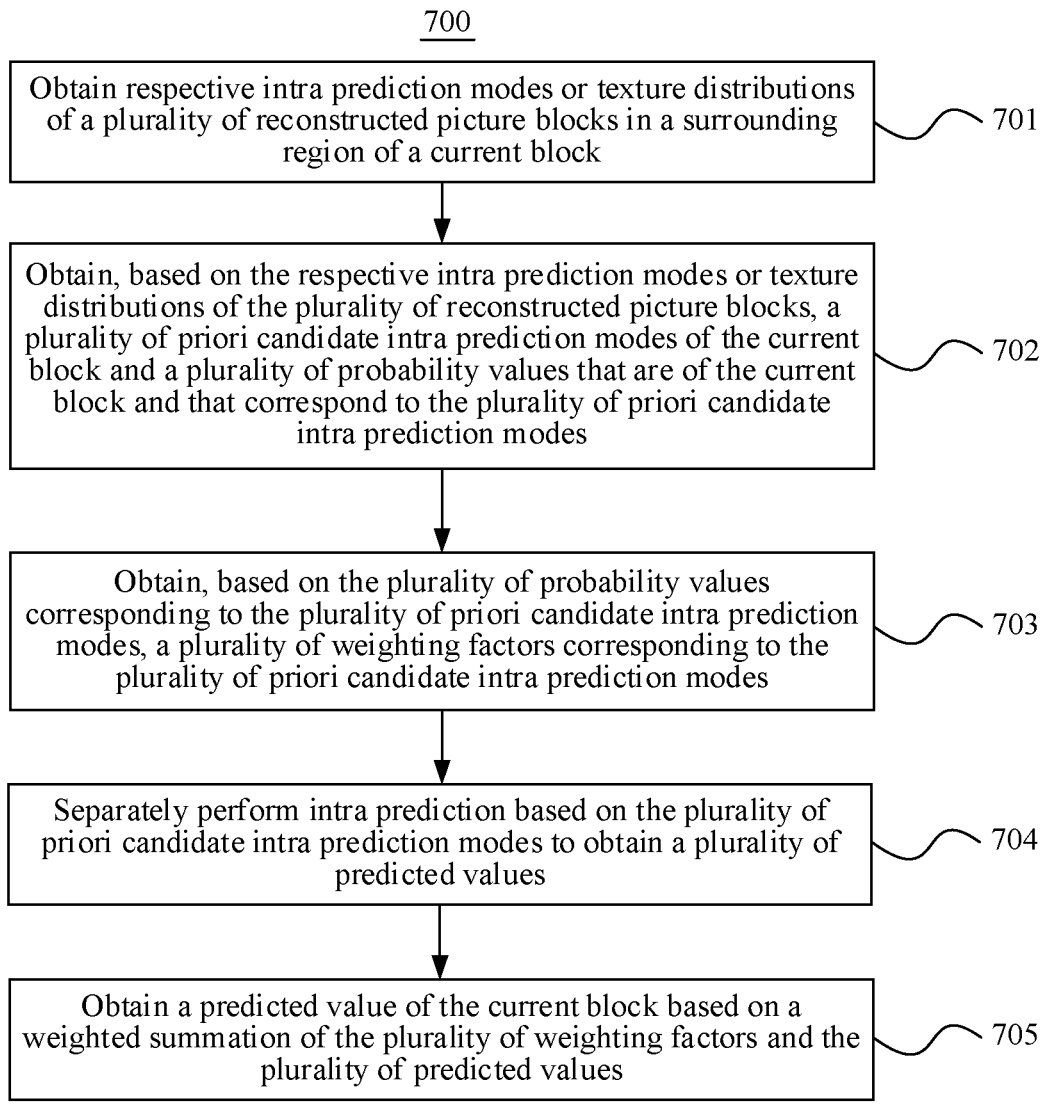
FIG. 7 is a flowchart of a process 700 of an intra prediction method according to an embodiment of this application.

FIG. 7 is a flowchart of a process 700 of an intra prediction method according to an embodiment of this application. The process 700 may be performed by a video encoder 20 or a video decoder 30, and specifically, may be performed by an intra prediction unit 254 or 354 of the video encoder 20 or the video decoder 30. The process 700 is described as a series of steps or operations. It should be understood that the steps or operations of the process 700 may be performed in various sequences and/or simultaneously, and are not limited to an execution sequence shown in FIG. 7. It is assumed that for a video data stream with a plurality of picture frames, a video encoder or a video decoder is being used to perform the process 700 including the following steps, to perform intra prediction on a picture or a picture block. The process 700 may include the following steps.

Step 701: Obtain respective intra prediction modes or texture distributions of a plurality of reconstructed picture blocks in a surrounding region of a current block.

Figure 9:
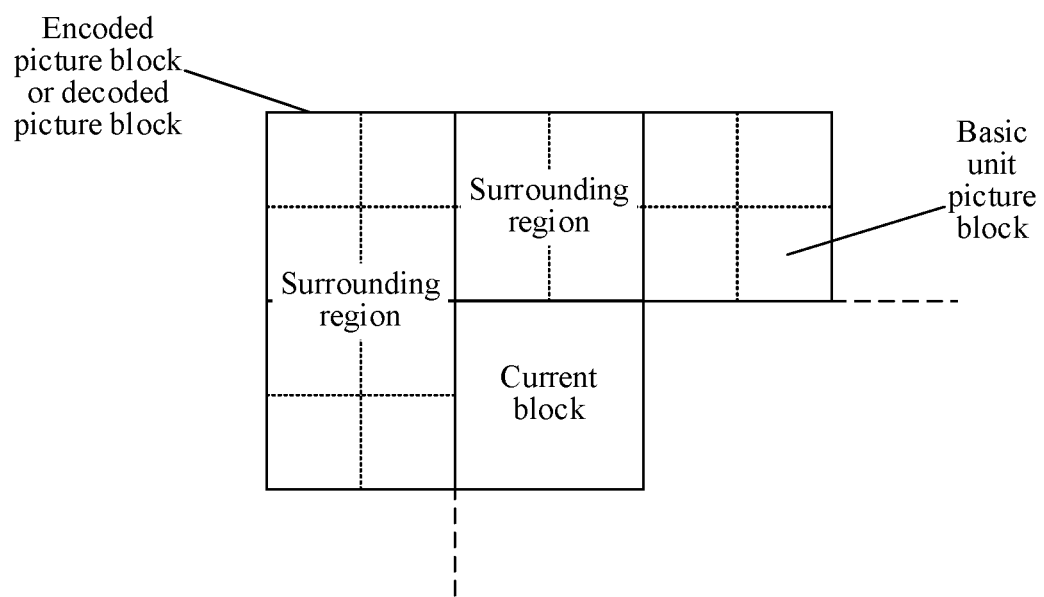
FIG. 9 is an example schematic diagram of a reconstructed picture block in a surrounding region according to an embodiment of this application.

The surrounding region of the current block includes a spatial neighborhood of the current block. Picture blocks of the spatial neighborhood may include a left candidate picture block located on a left side of the current block and an upper candidate picture block located above the current block. The reconstructed picture block may be an encoded picture block that has been encoded by an encoder side and whose reconstructed picture block has been obtained by the encoder side or a decoded picture block that has been decoded and reconstructed by a decoder side. The reconstructed picture block may also refer to a basic unit picture block of a preset size obtained by dividing an encoded picture block or a decoded picture block into equal sizes. For example, FIG. 9 is an example schematic diagram of a reconstructed picture block in a surrounding region according to an embodiment of this application. As shown in FIG. 9, a size of an encoded picture block or a decoded picture block may be, for example, 16×16, 64×64, or 32×16, and a size of a basic unit picture block may be, for example, 4×4 or 8×8.

The following uses a reconstructed picture block as an example for description. The reconstructed picture block may be any one of a plurality of reconstructed picture blocks in a surrounding region. For other reconstructed picture blocks, refer to the method.

In solution 1, an intra prediction mode of a reconstructed picture block may include: (1) a plurality of posteriori intra prediction modes of the reconstructed picture block, where the plurality of posteriori intra prediction modes are determined based on a reconstruction value of the reconstructed picture block and predicted values corresponding to a plurality of posteriori candidate intra prediction modes; or (2) an optimal intra prediction mode of the reconstructed picture block, where the optimal intra prediction mode is a posteriori intra prediction mode with a maximum probability value or a minimum prediction error value in the plurality of posteriori intra prediction modes.

The plurality of posteriori candidate intra prediction modes are obtained based on a plurality of priori candidate intra prediction modes of the reconstructed picture block. The plurality of posteriori candidate intra prediction modes may refer to the plurality of priori candidate intra prediction modes or may refer to some intra prediction modes in the plurality of priori candidate intra prediction modes.

The plurality of posteriori intra prediction modes of the reconstructed picture block may refer to the plurality of posteriori candidate intra prediction modes, or may refer to some intra prediction modes in the plurality of posteriori candidate intra prediction modes, for example, a plurality of specified intra prediction modes selected from the plurality of posteriori candidate intra prediction modes.

For the probability values or the prediction error values of the plurality of posteriori intra prediction modes, refer to the following descriptions.

In a possible implementation, in addition to the intra prediction modes of the reconstructed picture block, related information of the reconstructed picture block may be further obtained. The related information and a method for obtaining the related information are described as follows:

1. A plurality of prediction error values that are of the reconstructed picture block and that correspond to the plurality of posteriori intra prediction modes, where the plurality of prediction error values are also determined based on the reconstruction value of the reconstructed picture block and the predicted values corresponding to the plurality of posteriori candidate intra prediction modes.

Intra prediction is separately performed based on the plurality of posteriori candidate intra prediction modes, and a plurality of predicted values may be obtained. The plurality of predicted values correspond to the plurality of posteriori candidate intra prediction modes.

The plurality of predicted values are compared with the reconstruction value of the reconstructed picture block to obtain plurality of prediction error values. The plurality of prediction error values correspond to the plurality of posteriori candidate intra prediction modes. In this application, a prediction error value corresponding to a posteriori candidate intra prediction mode may be obtained by using a method such as SAD or SSE.

If the plurality of posteriori intra prediction modes of the reconstructed picture block refer to the plurality of posteriori candidate intra prediction modes, the plurality of prediction error values that are of the reconstructed picture block and that correspond to the plurality of posteriori intra prediction modes refer to a plurality of prediction error values corresponding to the plurality of posteriori candidate intra prediction modes. If the plurality of posteriori intra prediction modes of the reconstructed picture block refer to some intra prediction modes in the plurality of posteriori candidate intra prediction modes, the plurality of prediction error values that are of the reconstructed picture block and that correspond to the plurality of posteriori intra prediction modes refer to prediction error values that are selected from the plurality of prediction error values corresponding to the plurality of posteriori candidate intra prediction modes and that correspond to the intra prediction modes.

2. A plurality of probability values that are of the reconstructed picture block and that correspond to the plurality of posteriori intra prediction modes, where the plurality of probability values is also determined based on the reconstruction value of the reconstructed picture block and the predicted values corresponding to the plurality of posteriori candidate intra prediction modes.

The plurality of probability values that are of the reconstructed picture block and that correspond to the plurality of posteriori intra prediction modes may be obtained based on the following two methods:

One is obtaining the plurality of probability values of the reconstructed picture block based on the plurality of prediction error values of the reconstructed picture block that are obtained in the first method. For example, normalization processing may be performed on the plurality of prediction error values of the reconstructed picture block based on a method such as a normalized exponential function or a linear normalization method, to obtain normalized values of the plurality of prediction error values. The normalized values of the plurality of prediction error values are plurality of probability values of the reconstructed picture block. Based on a correspondence between the plurality of prediction error values of the reconstructed picture block and the plurality of posteriori intra prediction modes, the plurality of probability values of the reconstructed picture block also correspond to the plurality of posteriori intra prediction modes of the reconstructed picture block, the probability value may represent a probability that the posteriori intra prediction mode corresponding to the probability value becomes the optimal intra prediction mode of the reconstructed picture block.

The other is inputting the reconstruction value of the reconstructed picture block and the plurality of predicted values of the reconstructed picture block that are obtained in the first method into the trained neural network, to obtain a plurality of probability values that are of the reconstructed picture block and that correspond to the plurality of posteriori intra prediction modes. For the neural network, refer to descriptions of the training engine 25. Details are not described herein again.

Therefore, after the plurality of prediction error values or probability values corresponding to the plurality of posteriori intra prediction modes are obtained based on the foregoing two methods, the optimal intra prediction mode of the reconstructed picture block may be obtained based on the following two methods:

One is using a posteriori intra prediction mode corresponding to a minimum prediction error value in the plurality of prediction error values corresponding to the plurality of posteriori intra prediction modes as the optimal intra prediction mode of the reconstructed picture block.

The other is using a posteriori intra prediction mode corresponding to a maximum probability value in the plurality of probability values corresponding to the plurality of posteriori intra prediction modes as the optimal intra prediction mode of the reconstructed picture block.

In this application, the memory may be directly read to obtain the intra prediction mode or the intra prediction mode and related information of the reconstructed picture block. After the reconstructed picture block is encoded or decoded, the intra prediction mode or the intra prediction mode and related information of the reconstructed picture block may be immediately obtained based on the foregoing method, and then the intra prediction mode or the intra prediction mode and the related information are stored. When intra prediction is performed on a subsequent picture block (a current block), the intra prediction mode or the intra prediction mode and the related information may be directly read from a corresponding location in a memory. In this way, efficiency of intra prediction on the current block can be improved.

In this application, the intra prediction mode or the intra prediction mode and related information of the reconstructed picture block may be calculated only when intra prediction is performed on the current block. That is, when intra prediction is performed on the current block, the intra prediction mode or the intra prediction mode and related information of the reconstructed picture block are obtained based on the foregoing method. In this way, calculation is performed only when which reconstructed picture block needs to be used is determined, to save storage space.

If intra prediction is used in all encoding or decoding processes of the plurality of reconstructed picture blocks, the intra prediction mode or the intra prediction mode and related information of the plurality of reconstructed picture blocks may be obtained based on the foregoing method. If intra prediction is not used in encoding or decoding processes of some of the plurality of reconstructed picture blocks, an intra prediction mode or an intra prediction mode and related information of the some picture blocks may also be obtained based on any one of the methods described in the foregoing three cases.

If the reconstructed picture block includes a plurality of basic unit picture blocks, the intra prediction mode or the intra prediction mode and related information of the reconstructed picture block may be used as an intra prediction mode or an intra prediction mode and related information of all the basic unit picture blocks included in the reconstructed picture block. Further, the intra prediction mode or the intra prediction mode and related information of the reconstructed picture block may be used as an intra prediction mode or an intra prediction mode and related information of all pixels included in the reconstructed picture block.

In solution 2, a texture distribution of a reconstructed picture block includes a horizontal texture distribution of the reconstructed picture block and a vertical texture distribution of the reconstructed picture block.

A texture of a picture is a visual feature reflecting a homogeneity phenomenon in the picture, and reflects organization and arrangement attributes of a slowly or periodically changing surface structure on a surface of an object. The texture is different from picture features such as a grayscale and a color, and is represented by grayscale distributions of pixels and surrounding spatial neighborhoods. Different from the color feature, the texture feature is not a sample-based feature, but needs to be statistically calculated in a region including a plurality of samples. It may be considered that a texture of the reconstructed picture block includes many texture primitives. The texture distribution of the reconstructed picture block is analyzed based on the texture primitives. A representation form of a texture depends on different types of texture primitives, different directions of the texture primitives, and quantities of the texture primitives. The horizontal texture distribution of the reconstructed picture block may indicate a horizontal texture feature by using types of and quantities of texture primitives in the horizontal direction, and the vertical texture distribution may indicate a vertical texture feature by using types of and quantities of texture primitives in the vertical direction.

Step 702: Obtain, based on the respective intra prediction modes or texture distributions of the plurality of reconstructed picture blocks, a plurality of priori candidate intra prediction modes of the current block and a plurality of probability values that are of the current block and that correspond to the plurality of priori candidate intra prediction modes.

The plurality of priori candidate intra prediction modes of the current block may refer to all the remaining intra prediction modes after the respective pluralities of posteriori intra prediction modes of the plurality of reconstructed picture blocks are deduplicated, or may refer to some of all the remaining intra prediction modes after the respective pluralities of posteriori intra prediction modes of the plurality of reconstructed picture blocks are deduplicated.

The respective intra prediction modes or texture distributions of the plurality of reconstructed picture blocks may be input into a neural network, to obtain a plurality of priori candidate intra prediction modes of the current block and a plurality of probability values that are of the current block and that correspond to the plurality of priori candidate intra prediction modes. For the neural network, refer to descriptions of the training engine 25. Details are not described herein again.

Optionally, the respective pluralities of posteriori intra prediction modes of the plurality of reconstructed picture blocks and the plurality of prediction error values corresponding to the pluralities of posteriori intra prediction modes may be input to the trained neural network, to obtain a plurality of priori candidate intra prediction modes of a current block and a plurality of probability values that are of the current block and that correspond to the plurality of priori candidate intra prediction modes.

Optionally, the respective pluralities of posteriori intra prediction modes of the plurality of reconstructed picture blocks and the plurality of probability values corresponding to the pluralities of posteriori intra prediction modes may be input to the trained neural network, to obtain a plurality of priori candidate intra prediction modes of a current block and a plurality of probability values that are of the current block and that correspond to the plurality of priori candidate intra prediction modes.

Optionally, the optimal intra prediction modes of the plurality of reconstructed picture blocks may be input into a neural network, to obtain a plurality of priori candidate intra prediction modes of a current block and a plurality of probability values that are of the current block and that correspond to the plurality of priori candidate intra prediction modes.

Optionally, the horizontal texture distributions of and the vertical textures of the plurality of reconstructed picture blocks may be input into a neural network, to obtain a plurality of priori candidate intra prediction modes of a current block and a plurality of probability values that are of the current block and that correspond to the plurality of priori candidate intra prediction modes.

Step 703: Obtain, based on the plurality of probability values corresponding to the plurality of priori candidate intra prediction modes, a plurality of weighting factors corresponding to the plurality of priori candidate intra prediction modes.

When a sum of the plurality of probability values is 1, a probability value corresponding to a first priori candidate intra prediction mode is used as a weighting factor corresponding to the first priori candidate intra prediction mode. That is, respective weighting factors of the M priori candidate intra prediction modes are respective probability values of the plurality of priori candidate intra prediction modes. Alternatively, when a sum of the plurality of probability values is not 1, normalization processing is performed on the plurality of probability values, and a normalized value of a probability value corresponding to a first priori candidate intra prediction mode is used as a weighting factor corresponding to the first priori candidate intra prediction mode. That is, the respective weighting factors of the plurality of priori candidate intra prediction modes are normalized values of respective probability values of the plurality of priori candidate intra prediction modes. The first priori candidate intra prediction mode is any one of the plurality of priori candidate intra prediction modes. It can be learned that the sum of the plurality of weighting factors corresponding to the plurality of priori candidate intra prediction modes is 1.

Step 704: Separately perform intra prediction based on the plurality of priori candidate intra prediction modes to obtain a plurality of predicted values.

According to the principle of intra prediction, in a candidate intra prediction mode, a reference block in a surrounding region of a current block can be found, and intra prediction is performed on the current block based on the reference block, to obtain a predicted value corresponding to the candidate intra prediction mode. It can be learned that the predicted value of the current block corresponds to the candidate intra prediction mode. Therefore, intra prediction is separately performed based on the plurality of priori candidate intra prediction modes, and a plurality of predicted values of the current block can be obtained.

Step 705: Obtain a predicted value of the current block based on a weighted summation of the plurality of weighting factors and the plurality of predicted values.

A weighting factor corresponding to a priori candidate motion vector is multiplied by a predicted value corresponding to the same priori candidate intra prediction mode, and then, a plurality of products corresponding to a plurality of priori candidate intra prediction modes are added, to obtain a predicted value of the current block.

In this application, a plurality of weighting factors and a plurality of predicted values of the current block are obtained based on respective intra prediction information of a plurality of reconstructed picture blocks in a surrounding region of the current block, a weighting factor corresponding to a priori candidate intra prediction mode is multiplied by a predicted value corresponding to the same priori candidate intra prediction mode, and then, a plurality of products corresponding to the plurality of priori candidate intra prediction modes are added to obtain a predicted value of the current block. In this way, the predicted value of the current block is obtained by combining a plurality of priori candidate intra prediction modes, so that rich and variable textures in the real world can be better fitted, thereby improving accuracy of intra prediction, reducing an error of intra prediction, and improving overall RDO efficiency of intra prediction.

In a possible implementation, after the reconstruction value of the current block is obtained, the intra prediction mode or texture distribution of the current block may be immediately obtained. For the intra prediction mode or texture distribution, refer to step 701. The obtaining method includes:

1. Obtain, based on the reconstruction value of the current block and the predicted values corresponding to the plurality of posteriori candidate intra prediction modes of the current block, a plurality of posteriori intra prediction modes of the current block and a plurality of prediction error values that are of the current block and that correspond to the plurality of posteriori intra prediction modes, where the plurality of posteriori intra prediction modes of the current block are obtained based on the plurality of priori candidate intra prediction modes of the current block.
2. Obtain, based on the reconstruction value of the current block and the predicted values corresponding to the plurality of posteriori candidate intra prediction modes of the current block that are input to the neural network, a plurality of posteriori intra prediction modes of the current block and a plurality of probability values that are of the current block and that correspond to the plurality of posteriori intra prediction modes, where the plurality of posteriori intra prediction modes of the current block are obtained based on the plurality of priori candidate intra prediction modes of the current block, or obtain, based on the plurality of prediction error values of the current block, a plurality of probability values corresponding to the plurality of posteriori intra prediction modes of the current block.
3. Determine a posteriori intra prediction mode with a maximum probability value or a minimum prediction error value in the plurality of posteriori intra prediction modes of the current block as the optimal intra prediction mode of the current block.
4. Obtain a horizontal texture distribution of and a vertical texture of the current block.

In a possible implementation, the plurality of probability values of the current block includes M probability values. The M probability values are all greater than probability values other than the M probability values in the plurality of probability values of the current block. Therefore, M priori candidate intra prediction modes corresponding to the M probability values may be selected from the plurality of priori candidate intra prediction modes of the current block. Then, M weighting factors are obtained based on the M probability values. Intra prediction is separately performed based on the M priori candidate intra prediction modes, to obtain M predicted values of the current block. Finally, a predicted value of the current block is obtained by performing a weighted summation based on the M weighting factors and the M predicted values. That is, the first M probability values with maximum probability values are selected from the plurality of probability values that are of the current block and that correspond to the plurality of priori candidate intra prediction modes, M priori candidate intra prediction modes corresponding to the M probability values are selected from the plurality of priori candidate intra prediction modes of the current block, and weighting factors and predicted values are calculated based on the M probability values and the M priori candidate intra prediction modes, to obtain a predicted value of the current block. However, the remaining probability values, except the M probability values, in the plurality of probability values that are of the current block and that correspond to the plurality of priori candidate intra prediction modes may be ignored due to their small values. In this way, a calculation amount may be reduced, and efficiency of intra prediction can be improved.

The following uses several specific embodiments to describe in detail the technical solution of the method embodiment shown in FIG. 7.

Embodiment 1

In this embodiment, a plurality of priori candidate intra prediction modes of a current block and a plurality of prediction error values that are of the current block and that correspond to the plurality of priori candidate intra prediction modes are determined based on respective pluralities of posteriori intra prediction modes of a plurality of reconstructed picture blocks in a surrounding region and a plurality of probability values corresponding to the pluralities of posteriori intra prediction modes.

Figure 8:
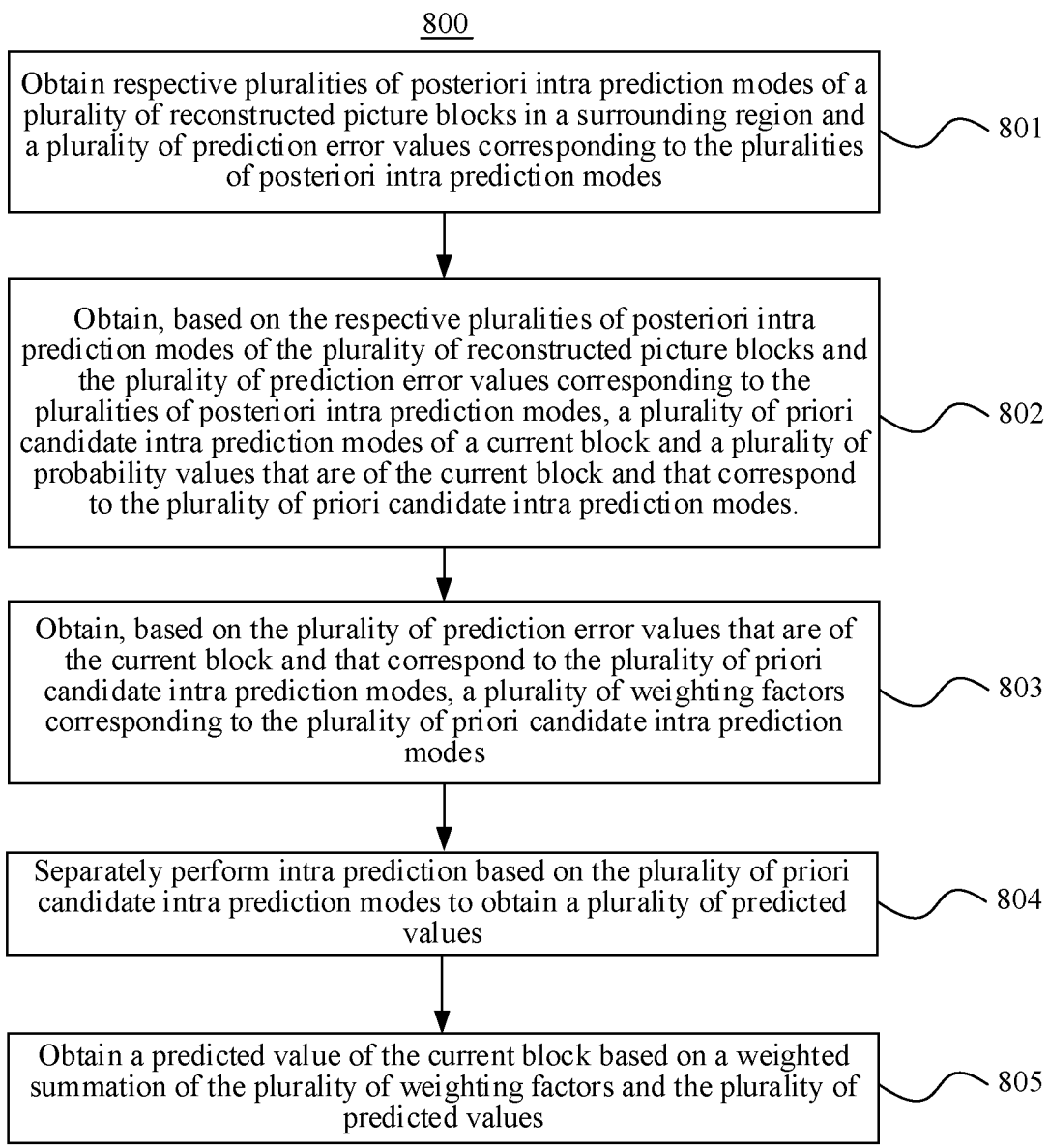
FIG. 8 is a flowchart of a process 800 of an intra prediction method according to an embodiment of this application.

FIG. 8 is a flowchart of a process 800 of an intra prediction method according to an embodiment of this application. The process 800 may be performed by a video encoder 20 or a video decoder 30, and specifically, may be performed by an intra prediction unit 254 or 354 of the video encoder 20 or the video decoder 30. The process 800 is described as a series of steps or operations. It should be understood that the steps or operations of the process 800 may be performed in various sequences and/or simultaneously, and are not limited to an execution sequence shown in FIG. 8. It is assumed that for a video data stream with a plurality of picture frames, a video encoder or a video decoder is being used to perform the process 800 including the following steps, to perform intra prediction on a picture or a picture block. The process 800 may include the following steps.

Step 801: Obtain respective pluralities of posteriori intra prediction modes of a plurality of reconstructed picture blocks in a surrounding region and a plurality of prediction error values corresponding to the pluralities of posteriori intra prediction modes.

The following uses a reconstructed picture block as an example for description. The reconstructed picture block may be any one of a plurality of reconstructed picture blocks in a surrounding region. For other reconstructed picture blocks, a plurality of posteriori intra prediction modes and a plurality of prediction error values corresponding to the plurality of posteriori intra prediction modes may be obtained by referring to the method.

There are N4 posteriori candidate intra prediction modes of the reconstructed picture block, and the N4 posteriori candidate intra prediction modes are obtained based on a plurality of priori candidate intra prediction modes of the reconstructed picture block. For the obtaining method, refer to the descriptions of step 701. Intra prediction is separately performed based on the N4 posteriori candidate intra prediction modes, to obtain N4 predicted values of the reconstructed picture block. The N4 predicted values correspond to the N4 posteriori candidate intra prediction modes. That is, intra prediction is performed on the reconstructed picture block based on a reference block corresponding to one posteriori candidate intra prediction mode, to obtain a predicted value of the reconstructed picture block. The N4 predicted values are compared with the reconstruction value of the reconstructed picture block to obtain N4 plurality of prediction error values of the reconstructed picture block. The N4 prediction error values correspond to the N4 posteriori candidate intra prediction modes. In this application, a prediction error value of a reconstructed picture block corresponding to a posteriori candidate intra prediction mode may be obtained based on a method such as SAD or SSE.

The N2 posteriori intra prediction modes of the reconstructed picture block may refer to the N4 posteriori candidate intra prediction modes, or may refer to some intra prediction modes in the N4 posteriori candidate intra prediction modes, for example, a plurality of specified intra prediction modes selected from the N4 posteriori candidate intra prediction modes.

Correspondingly, a quantity of prediction error values that are of the reconstructed picture block and that correspond to the N2 posteriori intra prediction modes is also N2.

All posteriori intra prediction modes of the plurality of reconstructed picture blocks may be represented as an N2×Q two-dimensional matrix, where N2 is a quantity of the plurality of posteriori intra prediction modes, Q is a quantity of reconstructed picture blocks, an element therein is represented as $M2_n^k$, k=0, 1, . . . , Q−1, representing an index of the reconstructed picture block, and n=0, 1, . . . , N2−1, representing an index of the posteriori intra prediction mode, which means the posteriori intra prediction mode indicated by n of the reconstructed picture block, where the reconstructed picture block is indicated by k.

All prediction error values of the plurality of reconstructed picture blocks may also be represented as an N2×Q two-dimensional matrix, where an element therein is represented as $E_{nb}^k$, k=0, 1, . . . , Q−1, representing an index of the reconstructed picture block, and n=0, 1, . . . , N2−1, representing an index of a posteriori intra prediction mode, which means a prediction error value corresponding to the posteriori intra prediction mode indicated by n of the reconstructed picture block, where the reconstructed picture block is indicated by k.

Step 802: Obtain, based on the respective pluralities of posteriori intra prediction modes of the plurality of reconstructed picture blocks and the plurality of prediction error values corresponding to the pluralities of posteriori intra prediction modes, a plurality of priori candidate intra prediction modes of a current block and a plurality of probability values that are of the current block and that correspond to the plurality of priori candidate intra prediction modes.

In this application, all prediction error values and all posteriori intra prediction modes of a plurality of reconstructed picture blocks, that is, the foregoing two N2×Q two-dimensional matrices, may be input into the trained neural network, and the neural network outputs a plurality of priori candidate intra prediction modes of a current block and a plurality of prediction error values that are of the current block and that correspond to the plurality of priori candidate intra prediction modes. For the neural network, refer to descriptions of the training engine 25. Details are not described herein again.

The plurality of priori candidate intra prediction modes of the current block may be represented as an N1×S two-dimensional matrix, where N1 is a quantity of priori candidate intra prediction modes of the current block, and S is a quantity of basic unit picture blocks or pixels included in the current block. If the current block is not further divided, S=1. An element in the matrix is represented as $M1_n^l$, where l=0, 1, . . . , S−1, representing an index of a basic unit picture block or a pixel, and n=0, 1, . . . , N1−1, representing an index of a priori candidate intra prediction mode, which means a priori candidate intra prediction mode indicated by n of a basic unit picture block or a pixel indicated by l.

The plurality of prediction error values that are of the current block and that correspond to the plurality of priori candidate intra prediction modes may also be represented as an N1×S two-dimensional matrix. An element in the matrix is represented as $P_{nc}^l$, where l=0, 1, . . . , S−1, representing an index of a basic unit picture block or a pixel, and n=0, 1, . . . , N1-1, representing an index of a priori candidate intra prediction mode, which means a probability at which a priori candidate intra prediction mode indicated by n of a basic unit picture block or a pixel indicated by l becomes an optimal intra prediction mode of the basic unit picture block or pixel.

Optionally, when l remains unchanged, that is, a sum of N1 probability values, corresponding to the N1 priori candidate intra prediction modes, of the basic unit picture block or pixel indicated by l is 1. Alternatively, $P_{nc}^l$ may be expressed in an integer manner, to obtain $\Sigma_{n=0}^{N1-1} P_{nc}^l = 256$. 256 is related to a binary bit quantity of an integer value of $P_{nc}^l$, and an integer value of $P_{nc}^l$ represented by 256 is represented by 8 bits. Therefore, $\Sigma_{n=0}^{N1-1} P_{nc}^l$ may also be equal to 128, 512, or the like.

Step 803: Obtain, based on the plurality of prediction error values that are of the current block and that correspond to the plurality of priori candidate intra prediction modes, a plurality of weighting factors corresponding to the plurality of priori candidate intra prediction modes.

The plurality of weighting factors that are of the current block and that correspond to the plurality of priori candidate intra prediction modes may also be represented as an N1×S two-dimensional matrix. An element in the matrix is represented as $W_n^l$, where l=0, 1, . . . , S−1, representing an index of a basic unit picture block or a pixel, and n=0, 1, . . . , N1-1, representing an index of a priori candidate intra prediction mode, which means a weighting factor of a priori candidate intra prediction mode indicated by n of a basic unit picture block or a pixel indicated by l.

If normalization processing is performed on N1 probability values that are of the basic unit picture block or pixel indicated by l in the current block and that correspond to the N1 priori candidate intra prediction modes, that is, $\Sigma_{n=0}^{N1-1} P_{nc}^l = 1$, the N1 probability values may be used as N1 weighting factors corresponding to the N1 priori candidate intra prediction modes, for example, $P_{nc}^l = W_n^l$. If normalization processing is not performed on N1 probability values that are of the basic unit picture block or pixel indicated by l in the current block and that correspond to N1 priori candidate intra prediction modes, normalization processing may be performed on the N1 probability values first, and then normalized values of the N1 probability values are used as N1 weighting factors corresponding to the N1 priori candidate intra prediction modes. Therefore, in a case in which 1 remains unchanged, $\sum_{n=0}^{N1-1} W_n^l = 1$.

Step 804: Separately perform intra prediction based on the plurality of priori candidate intra prediction modes to obtain a plurality of predicted values.

A priori candidate intra prediction mode is used as an example for description. The priori candidate intra prediction mode is any one of a plurality of priori candidate intra prediction modes. For all other priori candidate intra prediction modes, reference may be made to the method.

Intra prediction is performed based on the priori candidate intra prediction mode, to obtain a predicted value of a current block. Therefore, N1 predicted values may be obtained in the N1 priori candidate intra prediction modes.

The plurality of predicted values of the current block may be represented as a three-dimensional matrix of BH×WH×S, where BH×WH represents a size of a basic unit picture block included in the current block, and S is a quantity of basic unit picture blocks or pixels included in the current block. If the current block is not further divided, S=1. An element in the matrix is represented as $Pred_n^l(i,j)$, where l=0, 1, ..., S−1, representing an index of a basic unit picture block or a pixel, and n=0, 1, ..., N1-1, representing an index of a priori candidate intra prediction mode, which means a predicted value that is of a pixel in the $i^{th}$ row and the $j^{th}$ column in a basic unit picture block indicated by l and that correspond to a priori candidate intra prediction mode indicated by n.

Step 805: Obtain a predicted value of the current block based on a weighted summation of the plurality of weighting factors and the plurality of predicted values.

A weighting factor corresponding to a priori candidate intra prediction mode is multiplied by a predicted value corresponding to the same priori candidate intra prediction mode, and then, a plurality of products corresponding to a plurality of priori candidate intra prediction modes are added, to obtain a predicted value of the current block. In the current block, a predicted value of a pixel in the $i^{th}$ row and the $j^{th}$ column in the basic unit picture block indicated by l may be expressed as:

$$P^l(i,j) = \sum_{n=0}^{N1-1} W_n^l \times Pred_n^l(i,j)$$

Embodiment 2

In this embodiment, a plurality of priori candidate intra prediction modes of a current block and a plurality of probability values that are of the current block and that correspond to the plurality of priori candidate intra prediction modes are determined based on respective pluralities of posteriori intra prediction modes of a plurality of reconstructed picture blocks in a surrounding region and a plurality of probability values corresponding to the pluralities of posteriori intra prediction modes.

Figure 10:
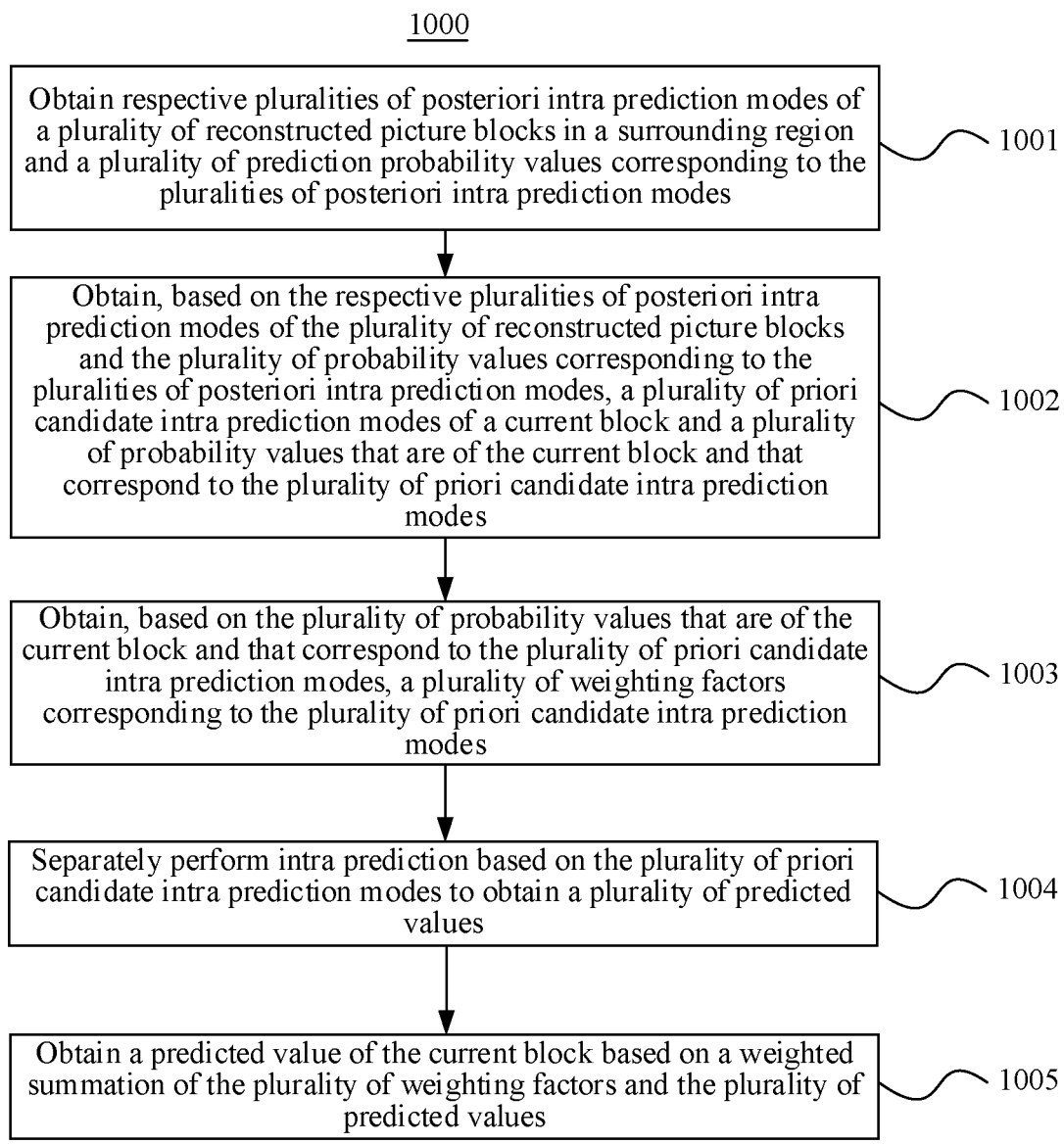
FIG. 10 is a flowchart of a process 1000 of an intra prediction method according to an embodiment of this application.

FIG. 10 is a flowchart of a process 1000 of an intra prediction method according to an embodiment of this application. The process 1000 may be performed by a video encoder 20 or a video decoder 30, and specifically, may be performed by an intra prediction unit 254 or 354 of the video encoder 20 or the video decoder 30. The process 1000 is described as a series of steps or operations. It should be understood that the steps or operations of the process 1000 may be performed in various sequences and/or simultaneously, and are not limited to an execution sequence shown in FIG. 10. It is assumed that for a video data stream with a plurality of picture frames, a video encoder or a video decoder is being used to perform the process 1000 including the following steps, to perform intra prediction on a picture or a picture block. The process 1000 may include the following steps.

Step 1001: Obtain respective pluralities of posteriori intra prediction modes of a plurality of reconstructed picture blocks in a surrounding region and a plurality of prediction probability values corresponding to the pluralities of posteriori intra prediction modes.

Step 1001 in this embodiment differs from step 801 in Embodiment 1 in that: the plurality of prediction error values corresponding to the plurality of posteriori intra prediction modes are changed to a plurality of probability values corresponding to the plurality of posteriori intra prediction modes.

The following uses a reconstructed picture block as an example for description. The reconstructed picture block may be any one of a plurality of reconstructed picture blocks in a surrounding region. For other reconstructed picture blocks, a plurality of posteriori intra prediction modes and a plurality of probability values corresponding to the plurality of posteriori intra prediction modes may be obtained by referring to the method.

N2 posteriori intra prediction modes of the reconstructed picture block may be obtained with reference to the method in step 801, and details are not described herein again.

N2 probability values that are of the reconstructed picture block and that correspond to N2 posteriori intra prediction modes may be obtained based on the following two methods:

One is obtaining N2 probability values of the reconstructed picture block based on N2 prediction error values of the reconstructed picture block obtained based on Embodiment 1.

The N2 prediction error values of the reconstructed picture block correspond to one N2-dimensional vector of all prediction error values of the plurality of reconstructed picture blocks, where an element therein is represented as $E_{nb}^{k1}$, k1 is an index of the reconstructed picture block, n=0, 1, ..., N2−1, representing an index of a posteriori intra prediction mode, and N2 probability values of the reconstructed picture block may be calculated based on the N2 prediction error values of the reconstructed picture block. The N2 probability values of the reconstructed picture block may also be represented as an N2-dimensional vector, where an element therein is represented as $P_{nb}^{k1}$, k1 is an index of the reconstructed picture block, n=0, 1, ..., N2−1, representing an index of a posteriori intra prediction mode, which means a probability at which a posteriori intra prediction mode indicated by n of a reconstructed picture block becomes an optimal intra prediction mode of the reconstructed picture block, where the reconstructed picture block is indicated by k1.

Optionally, $E_{nb}^{k1}$ may be converted to $P_{nb}^{k1}$ by using the following normalized exponential function:

$$P_{nb}^{k1} = \frac{e^{-E_{nb}^{k1}}}{\sum_{n=0}^{N2-1} e^{-E_{nb}^{k1}}}.$$

For another example, $E_{nb}^{k1}$ may be converted to $P_{nb}^{k1}$ based on a linear normalization method.

Therefore, when k remains unchanged, $\Sigma_{n=0}^{N2-1} P_{nk}^{k}=1$.

The other is inputting a reconstruction value of a first reconstructed picture block and N2 predicted values corresponding to N2 posteriori intra prediction modes into the trained neural network, to obtain N2 probability values that are of the reconstructed picture block and that correspond to the N2 posteriori intra prediction modes. For the neural network, refer to descriptions of the training engine 25. Details are not described herein again.

The reconstruction value of the reconstructed picture block may be obtained after the reconstructed picture block is encoded. For N2 predicted values that are of the reconstructed picture block and that correspond to the N2 posteriori intra prediction modes, refer to the method in step 801 in Embodiment 1. Details are not described herein again.

All posteriori intra prediction modes of the plurality of reconstructed picture blocks may be represented as an N2×Q two-dimensional matrix, where N2 is a quantity of posteriori intra prediction modes, Q is a quantity of reconstructed picture blocks, an element therein is represented as $M2_n^k$, k=0, 1, . . . , Q−1, representing an index of the reconstructed picture block, and n=0, 1, . . . , N2−1, representing an index of the posteriori intra prediction mode, which means the posteriori intra prediction mode indicated by n of the reconstructed picture block, where the reconstructed picture block is indicated by k.

All probability values of the plurality of reconstructed picture blocks may be represented as an N2×Q two-dimensional matrix, where N2 is a quantity of posteriori intra prediction modes, Q is a quantity of reconstructed picture blocks, an element therein is represented as $P_{nb}^k$, k=0, 1, . . . , Q−1, representing an index of the reconstructed picture block, and n=0, 1, . . . , N2−1, representing an index of the posteriori intra prediction mode, which means the posteriori intra prediction mode indicated by n of the reconstructed picture block, where the reconstructed picture block is indicated by k.

Step 1002: Obtain, based on the respective pluralities of posteriori intra prediction modes of the plurality of reconstructed picture blocks and the plurality of probability values corresponding to the pluralities of posteriori intra prediction modes, a plurality of priori candidate intra prediction modes of a current block and a plurality of probability values that are of the current block and that correspond to the plurality of priori candidate intra prediction modes.

Step 1002 in this embodiment differs from step 802 in Embodiment 1 in that: the plurality of prediction error values that are input to the neural network and that correspond to the plurality of posteriori intra prediction modes are changed to a plurality of probability values corresponding to the plurality of posteriori intra prediction modes.

Step 1003: Obtain, based on the plurality of probability values that are of the current block and that correspond to the plurality of priori candidate intra prediction modes, a plurality of weighting factors corresponding to the plurality of priori candidate intra prediction modes.

Step 1004: Separately perform intra prediction based on the plurality of priori candidate intra prediction modes to obtain a plurality of predicted values.

Step 1005: Obtain a predicted value of the current block based on a weighted summation of the plurality of weighting factors and the plurality of predicted values.

For step 1003 to step 1005 in this embodiment, refer to step 803 to step 805 in Embodiment 1, and details are not described herein again.

Embodiment 3

In this embodiment, a plurality of priori candidate intra prediction modes of a current block and a plurality of probability values that are of the current block and that correspond to the plurality of priori candidate intra prediction modes are determined based on respective optimal intra prediction modes of a plurality of reconstructed picture blocks in a surrounding region.

Figure 11:
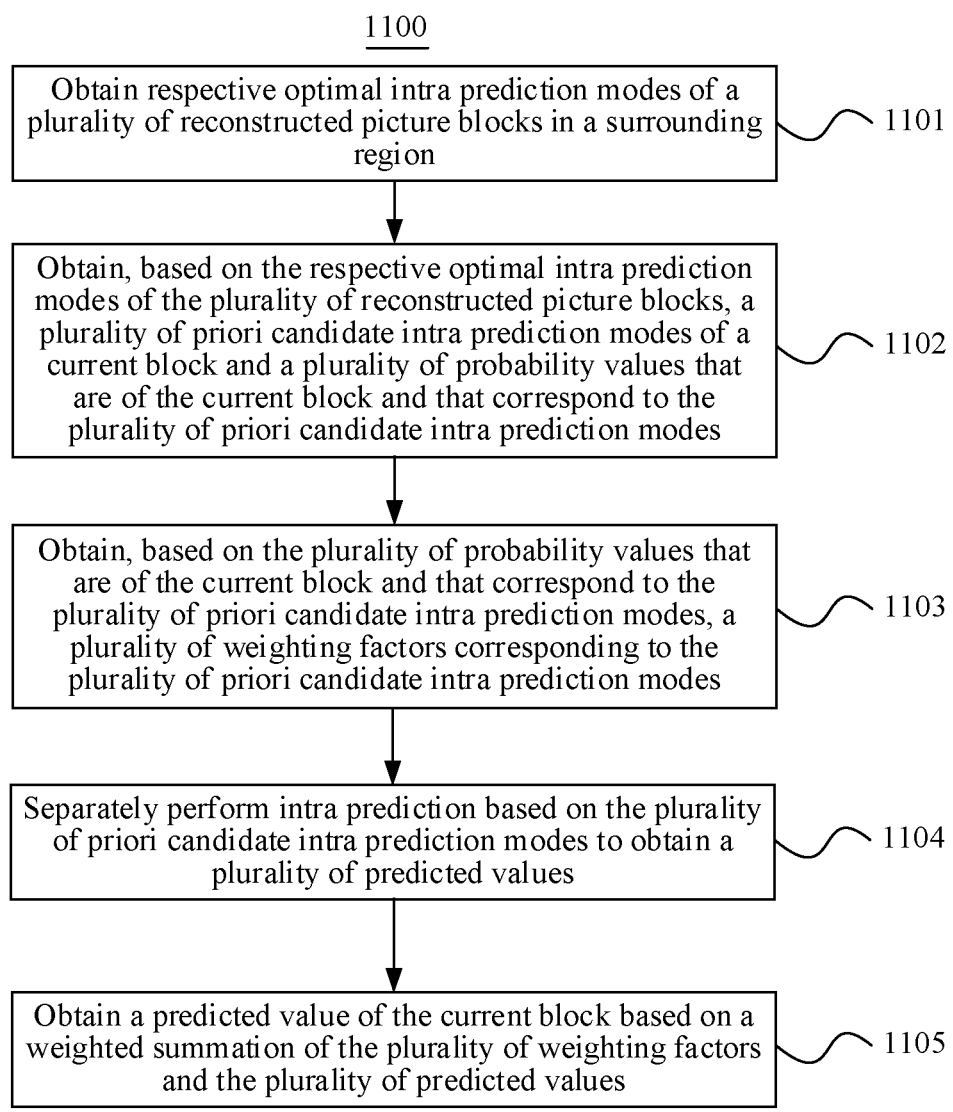
FIG. 11 is a flowchart of a process 1100 of an intra prediction method according to an embodiment of this application.

FIG. 11 is a flowchart of a process 1100 of an intra prediction method according to an embodiment of this application. The process 1100 may be performed by a video encoder 20 or a video decoder 30, and specifically, may be performed by an intra prediction unit 254 or 354 of the video encoder 20 or the video decoder 30. The process 1100 is described as a series of steps or operations. It should be understood that the steps or operations of the process 1100 may be performed in various sequences and/or simultaneously, and are not limited to an execution sequence shown in FIG. 11. It is assumed that for a video data stream with a plurality of picture frames, a video encoder or a video decoder is being used to perform the process 1100 including the following steps, to perform intra prediction on a picture or a picture block. The process 1100 may include the following steps.

Step 1101: Obtain respective optimal intra prediction modes of a plurality of reconstructed picture blocks in a surrounding region.

Step 1101 in this embodiment differs from step 801 in Embodiment 1 in that: the plurality of posteriori intra prediction modes and the plurality of prediction error values corresponding to the plurality of posteriori intra prediction modes are changed into optimal intra prediction modes.

The following uses a reconstructed picture block as an example for description. The reconstructed picture block may be any one of a plurality of reconstructed picture blocks in a surrounding region, and optimal intra prediction mode of other reconstructed picture blocks may all be obtained by referring to the method.

The optimal intra prediction mode of the reconstructed picture block may be obtained based on the following two methods:

One is obtaining the optimal intra prediction mode of the reconstructed picture block based on N2 prediction error values of the reconstructed picture block that are obtained in Embodiment 1, that is, using a posteriori intra prediction mode corresponding to a minimum prediction error value in the N2 prediction error values of the reconstructed picture block as the optimal intra prediction mode of the reconstructed picture block.

The other is obtaining the optimal intra prediction mode of the reconstructed picture block based on N2 probability values of the reconstructed picture block that are obtained in Embodiment 2, that is, using a posteriori intra prediction mode corresponding to a maximum probability value in the N2 probability values of the reconstructed picture block as the optimal intra prediction mode of the reconstructed picture block.

Step 1102: Obtain, based on the respective optimal intra prediction modes of the plurality of reconstructed picture blocks, a plurality of priori candidate intra prediction modes of a current block and a plurality of probability values that are of the current block and that correspond to the plurality of priori candidate intra prediction modes.

Step 1102 in this embodiment differs from step 802 in Embodiment 1 in that: the plurality of posteriori intra prediction modes and the plurality of prediction error values corresponding to the plurality of posteriori intra prediction modes that are input into the neural network are changed into optimal intra prediction modes of a plurality of reconstructed picture blocks.

Step 1103: Obtain, based on the plurality of probability values that are of the current block and that correspond to the plurality of priori candidate intra prediction modes, a plurality of weighting factors corresponding to the plurality of priori candidate intra prediction modes.

Step 1104: Separately perform intra prediction based on the plurality of priori candidate intra prediction modes to obtain a plurality of predicted values.

Step 1105: Obtain a predicted value of the current block based on a weighted summation of the plurality of weighting factors and the plurality of predicted values.

For step 1103 to step 1105 in this embodiment, refer to step 803 to step 805 in Embodiment 1, and details are not described herein again.

Embodiment 4

In this embodiment, a plurality of priori candidate intra prediction modes of a current block and a plurality of probability values that are of the current block and that correspond to the plurality of priori candidate intra prediction modes are determined based on respective horizontal texture distributions of and respective vertical texture distribution of a plurality of reconstructed picture blocks in a surrounding region.

Figure 12:
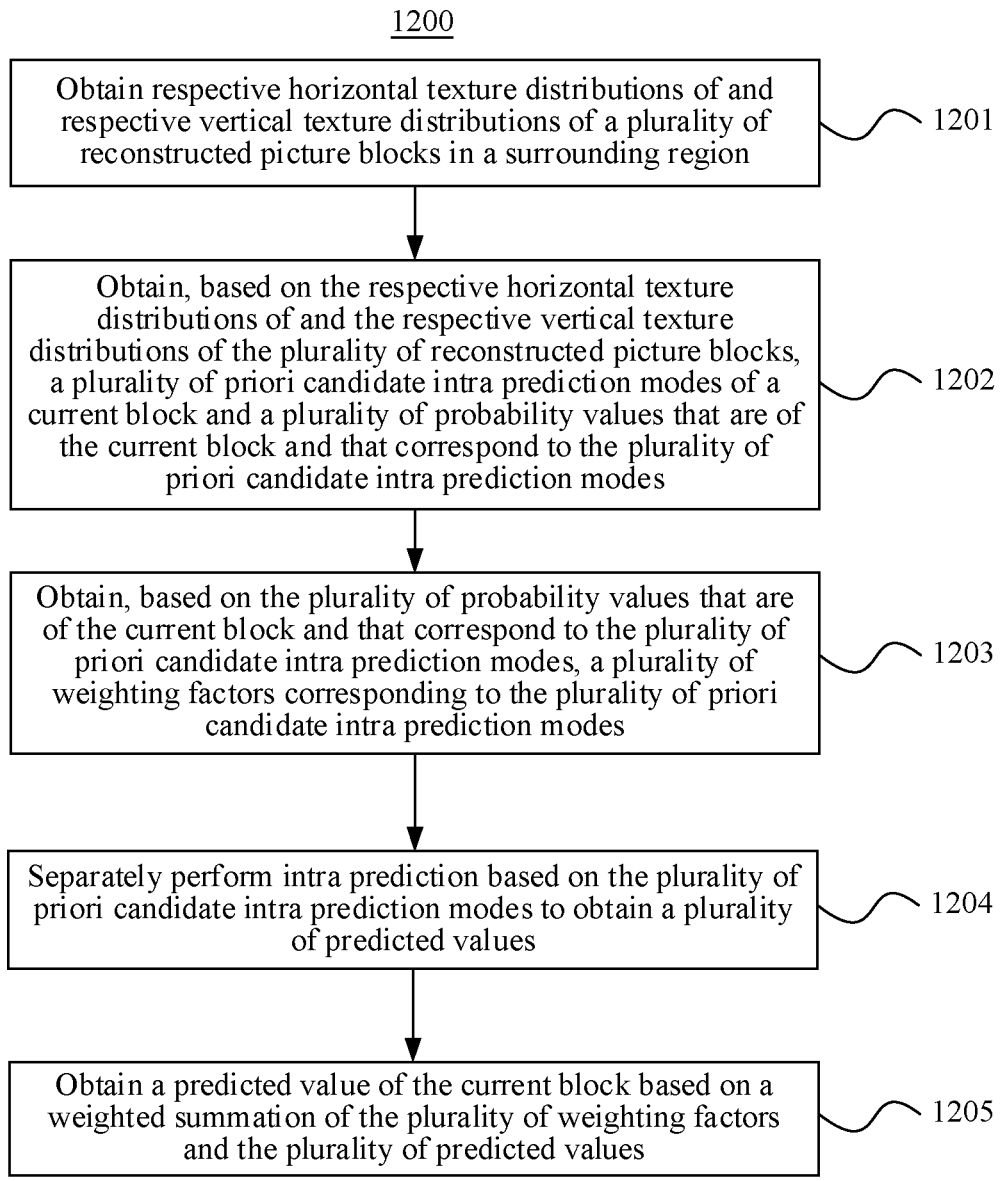
FIG. 12 is a flowchart of a process 1200 of an intra prediction method according to an embodiment of this application.

FIG. 12 is a flowchart of a process 1200 of an intra prediction method according to an embodiment of this application. The process 1200 may be performed by a video encoder 20 or a video decoder 30, and specifically, may be performed by an intra prediction unit 254 or 354 of the video encoder 20 or the video decoder 30. The process 1200 is described as a series of steps or operations. It should be understood that the steps or operations of the process 1200 may be performed in various sequences and/or simultaneously, and are not limited to an execution sequence shown in FIG. 12. It is assumed that for a video data stream with a plurality of picture frames, a video encoder or a video decoder is used to perform the process 1200 including the following steps, to perform intra prediction on a picture or a picture block. The process 1200 may include the following steps.

Step 1201: Obtain respective horizontal texture distributions and respective vertical texture distributions of a plurality of reconstructed picture blocks in a surrounding region.

Step 1201 in this embodiment differs from step 801 in Embodiment 1 in that: the plurality of posteriori intra prediction modes and the plurality of prediction error values corresponding to the plurality of posteriori intra prediction modes are changed into horizontal texture distributions and vertical texture distributions.

A texture of a picture is a visual feature reflecting a homogeneity phenomenon in the picture, and reflects organization and arrangement attributes of a slowly or periodically changing surface structure on a surface of an object. The texture is different from picture features such as a grayscale and a color, and is represented by grayscale distributions of pixels and surrounding spatial neighborhoods. Different from the color feature, the texture feature is not a sample-based feature, but needs to be statistically calculated in a region including a plurality of samples. It may be considered that a texture of the reconstructed picture block includes many texture primitives. The texture distribution of the reconstructed picture block is analyzed based on the texture primitives. A representation form of a texture depends on different types of texture primitives, different directions, and a quantity.

Step 1202: Obtain, based on the respective horizontal texture distributions of and the respective vertical texture distributions of the plurality of reconstructed picture blocks, a plurality of priori candidate intra prediction modes of a current block and a plurality of probability values that are of the current block and that correspond to the plurality of priori candidate intra prediction modes.

Step 1202 in this embodiment differs from step 802 in Embodiment 1 in that: the plurality of posteriori intra prediction modes and the plurality of prediction error values corresponding to the plurality of posteriori intra prediction modes that are input into the neural network are changed into horizontal texture distributions of and vertical texture distributions of a plurality of reconstructed picture blocks.

Step 1203: Obtain, based on the plurality of probability values that are of the current block and that correspond to the plurality of priori candidate intra prediction modes, a plurality of weighting factors corresponding to the plurality of priori candidate intra prediction modes.

Step 1204: Separately perform intra prediction based on the plurality of priori candidate intra prediction modes to obtain a plurality of predicted values.

Step 1205: Obtain a predicted value of the current block based on a weighted summation of the plurality of weighting factors and the plurality of predicted values.

For step 1203 to step 1205 in this embodiment, refer to step 803 to step 805 in Embodiment 1, and details are not described herein again.

Figure 13:
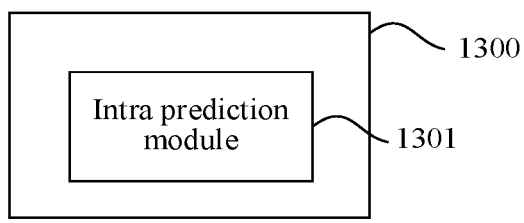
FIG. 13 is a schematic diagram of a structure of a decoding apparatus 1300 according to an embodiment of this application.

FIG. 13 is a schematic diagram of a structure of a decoding apparatus 1300 according to an embodiment of this application. The decoding apparatus 1300 may correspond to a video encoder 20 or a video decoder 30. The decoding apparatus 1300 includes an intra prediction module 1301, configured to implement the method embodiment shown in any one of FIG. 7 to FIG. 13. In an example, the intra prediction module 1301 may correspond to the intra prediction unit 254 in FIG. 2, or correspond to the intra prediction unit 354 in FIG. 3. It should be understood that the coding apparatus 1300 may include another unit related to the intra prediction unit 254 or the intra prediction unit 354, and details are not described herein again.

In an implementation process, steps in the foregoing method embodiments can be implemented via a hardware integrated logical circuit in the processor, or via instructions in a form of software. The processor may be a general-purpose processor, a DSP, an ASIC, a FPGA or another programmable logic device, a discrete gate or transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. A software module may be located in a mature storage medium in the art, such as a RAM, a flash memory, a ROM, a programmable ROM (PROM), an electrically erasable PROM (EEPROM), or a register. The storage medium is located in the memory, and a processor reads information in the memory and completes the steps in the foregoing methods in combination with hardware of the processor.

The memory in the foregoing embodiments may be a volatile memory or a non-volatile memory, or may include both a volatile memory and a non-volatile memory. The nonvolatile memory may be a ROM, a PROM, an erasable PROM (EPROM), an EEPROM, or a flash memory. The volatile memory may be a RAM used as an external cache. Through example but not limitative description, many forms of RAMs may be used, for example, a SRAM, a DRAM, a synchronous DRAM (SDRAM), a double data rate (DDR) SDRAM, an enhanced SDRAM (ESDRAM), a synchronous link DRAM (SLDRAM), and a direct Rambus (DR) DRAM. Notably, the memory of the systems and methods described in this specification includes but is not limited to these and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented via some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions in this application essentially, or the part contributing to the conventional technology, or a part of the technical solutions may be implemented in a form of a software product. The computer software product is stored in a storage medium and includes several instructions for instructing a computer device (a personal computer, a server, a network device, or the like) to perform all or a part of the steps of the methods in embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An intra prediction method, comprising:
   obtaining respective intra prediction modes of P reconstructed picture blocks in a surrounding region of a current block or respective texture distributions of the P reconstructed picture blocks, wherein P is a first positive integer, wherein the surrounding region comprises a spatial neighborhood of the current block;
   obtaining, based on the respective intra prediction modes of the P reconstructed picture blocks or the respective texture distributions of the P reconstructed picture blocks, Q priori candidate intra prediction modes of the current block and Q probability values that are of the current block and that correspond to the Q priori candidate intra prediction modes, wherein Q is a second positive integer;
   obtaining, based on M probability values corresponding to M priori candidate intra prediction modes, M weighting factors corresponding to the M priori candidate intra prediction modes, wherein obtaining the M weighting factors comprises performing, when a sum of the M probability values is not 1, normalization processing on the M probability values and using a normalized value of a probability value corresponding to a first priori candidate intra prediction mode as a weighting factor corresponding to the first priori candidate intra prediction mode, wherein the first priori candidate intra prediction mode is any one of the M priori candidate intra prediction modes, wherein M is a third positive integer, and wherein M is less than or equal to Q;
   separately performing intra prediction based on the M priori candidate intra prediction modes to obtain M predicted values; and
   obtaining a predicted value of the current block based on a weighted summation of the M predicted values and the M weighting factors.

2. The intra prediction method of claim 1, wherein obtaining the Q priori candidate intra prediction modes and the Q probability values comprises inputting the respective intra prediction modes of the P reconstructed picture blocks or the respective texture distributions of the P reconstructed picture blocks into a trained neural network to obtain the Q priori candidate intra prediction modes and the Q probability values that are of the current block and that correspond to the Q priori candidate intra prediction modes.

3. The intra prediction method of claim 1, wherein obtaining the M weighting factors comprises: using, when the sum of the M probability values is 1, the probability value corresponding to the first priori candidate intra prediction mode as the weighting factor corresponding to the first priori candidate intra prediction mode.

4. The intra prediction method of claim 1, wherein M is equal to Q, and wherein the M probability values are the Q probability values.

5. The intra prediction method of claim 1, wherein M is less than Q, and wherein the M probability values are greater than probability values other than the M probability values in the Q probability values.

6. The intra prediction method of claim 1, wherein obtaining the Q priori candidate intra prediction modes and the Q probability values comprises inputting respective pluralities of posteriori intra prediction modes of the P reconstructed picture blocks and a plurality of probability values corresponding to the respective pluralities of posteriori intra prediction modes into a trained neural network to obtain the Q priori candidate intra prediction modes of the current block and Q probability values that are of the current block and that correspond to the Q priori candidate intra prediction modes, wherein the respective pluralities of posteriori intra prediction modes of a reconstructed picture block and the plurality of probability values corresponding to the respective pluralities of posteriori intra prediction modes are determined based on reconstruction values of the reconstructed picture block and predicted values corresponding to a plurality of posteriori candidate intra prediction modes, and wherein the reconstructed picture block is any one of the P reconstructed picture blocks.

7. The intra prediction method of claim 1, wherein obtaining the Q priori candidate intra prediction modes and the Q probability values comprises inputting respective pluralities of posteriori intra prediction modes of the P reconstructed picture blocks and a plurality of prediction error values corresponding to the respective pluralities of posteriori intra prediction modes into a trained neural network to obtain the Q priori candidate intra prediction modes of the current block and Q probability values that are of the current block and that correspond to the Q priori candidate intra prediction modes, wherein the respective pluralities of posteriori intra prediction modes of a reconstructed picture block and the plurality of prediction error values corresponding to the respective pluralities of posteriori intra prediction modes are determined based on reconstruction values of the reconstructed picture block and predicted values corresponding to a plurality of posteriori candidate intra prediction modes, and wherein the reconstructed picture block is any one of the P reconstructed picture blocks.

8. The intra prediction method of claim 1, wherein obtaining the Q priori candidate intra prediction modes and the Q probability values comprises inputting respective optimal intra prediction modes of the P reconstructed picture blocks into a trained neural network to obtain Q priori candidate intra prediction modes of the current block and Q probability values that are of the current block and that correspond to the Q priori candidate intra prediction modes, wherein an optimal intra prediction mode of a reconstructed picture block is a posteriori intra prediction mode with a maximum probability value or a minimum prediction error value in the plurality of posteriori intra prediction modes, wherein the reconstructed picture block is any one of the P reconstructed picture blocks, and wherein either the plurality of posteriori intra prediction modes of the reconstructed picture block correspond to a plurality of probability values, and the plurality of posteriori intra prediction modes and the plurality of probability values corresponding to the plurality of posteriori intra prediction modes are determined based on a reconstruction value of the reconstructed picture block and predicted values corresponding to the plurality of posteriori candidate intra prediction modes, or the plurality of posteriori intra prediction modes of the reconstructed picture block correspond to a plurality of prediction error values, and the plurality of posteriori intra prediction modes and the plurality of prediction error values corresponding to the plurality of posteriori intra prediction modes are determined based on the reconstruction value of the reconstructed picture block and predicted values corresponding to the plurality of posteriori candidate intra prediction modes.

9. The intra prediction method of claim 1, wherein obtaining the Q priori candidate intra prediction modes and the Q probability values comprises inputting respective horizontal texture distributions of the P reconstructed picture blocks and respective vertical texture distributions of the P reconstructed picture blocks into a trained neural network to obtain the Q priori candidate intra prediction modes of the current block and Q probability values that are of the current block and that correspond to the Q priori candidate intra prediction modes, wherein a texture distribution comprises a horizontal texture distribution and a vertical texture distribution, wherein the horizontal texture distribution and the vertical texture distribution of the reconstructed picture block are obtained based on texture primitives of the reconstructed picture block, and wherein the reconstructed picture block is any one of the P reconstructed picture blocks.

10. The intra prediction method of claim 6, further comprising:
    obtaining a training data set comprising information about a plurality of groups of picture blocks, wherein the information comprises respective pluralities of posteriori intra prediction modes of a plurality of reconstructed picture blocks, a plurality of probability values corresponding to the respective pluralities of posteriori intra prediction modes, a plurality of posteriori intra prediction modes of the current block, and a plurality of probability values that are of the current block and that correspond to the plurality of posteriori intra prediction modes, wherein the plurality of reconstructed picture blocks are the picture blocks in the spatial neighborhood of the current block; and
    obtaining a neural network through training based on the training data set.

11. The intra prediction method of claim 7, further comprising:
    obtaining a training data set comprising information about a plurality of groups of picture blocks, wherein the information comprises respective pluralities of posteriori intra prediction modes of a plurality of reconstructed picture blocks, a plurality of prediction error values corresponding to the respective pluralities of posteriori intra prediction modes, a plurality of posteriori intra prediction modes of the current block, and a plurality of probability values that are of the current block and that correspond to the plurality of posteriori intra prediction modes, and wherein the plurality of reconstructed picture blocks are the picture blocks in the spatial neighborhood of the current block; and
    obtaining a neural network through training based on the training data set.

12. The intra prediction method of claim 8, further comprising:
    obtaining a training data set comprising information about a plurality of groups of picture blocks, wherein the information comprises respective optimal intra prediction modes of a plurality of reconstructed picture blocks, a plurality of posteriori intra prediction modes of the current block, and a plurality of probability values that are of the current block and that correspond to the plurality of posteriori intra prediction modes, and wherein the plurality of reconstructed picture blocks are the picture blocks in the spatial neighborhood of the current block; and obtaining a neural network through training based on the training data set.

13. The intra prediction method of claim 9, further comprising:

obtaining a training data set comprising information about a plurality of groups of picture blocks, wherein the information comprises respective horizontal texture distributions of and respective vertical texture distributions of a plurality of reconstructed picture blocks, a plurality of posteriori intra prediction modes of the current block, and a plurality of probability values that are of the current block and that correspond to the plurality of posteriori intra prediction modes, and wherein the plurality of reconstructed picture blocks are the picture blocks in the spatial neighborhood of the current block; and obtaining a neural network through training based on the training data set.

14. The intra prediction method of claim 2, wherein the trained neural network comprises a convolutional layer or an activation layer.

15. The intra prediction method of claim 14, wherein a depth of a convolution kernel of the convolutional layer is 2, 3, 4, 5, 6, 16, 24, 32, 48, 64, or 128, and wherein a size of the convolution kernel of the convolutional layer is 1×1, 3×3, 5×5, or 7×7.

16. The intra prediction method of claim 2, wherein the trained neural network comprises a convolutional neural network (CNN), a deep neural network (DNN), or a recurrent neural network (RNN).

17. A coding apparatus, comprising:
a memory configured to store instructions; and
a processor coupled to the memory and configured to:
obtain respective intra prediction modes of P reconstructed picture blocks in a surrounding region of a current block or respective texture distributions of the P reconstructed picture blocks, wherein P is a first positive integer, wherein the surrounding region comprises a spatial neighborhood of the current block;
obtain, based on the respective intra prediction modes of the P reconstructed picture blocks or the respective texture distributions of the P reconstructed picture blocks, Q priori candidate intra prediction modes of the current block and Q probability values that are of the current block and that correspond to the Q priori candidate intra prediction modes wherein Q is a second positive integer;
obtain, based on M probability values corresponding to M priori candidate intra prediction modes, M weighting factors corresponding to the M priori candidate intra prediction modes, wherein obtaining the M weighting factors comprises performing, when a sum of the M probability values is not 1, normalization processing on the M probability values and using a normalized value of a probability value corresponding to a first priori candidate intra prediction mode as a weighting factor corresponding to the first priori candidate intra prediction mode, wherein the first priori candidate intra prediction mode is any one of the M priori candidate intra prediction modes, wherein M is a third positive integer, and wherein M is less than or equal to Q;
separately perform intra prediction based on the M priori candidate intra prediction modes to obtain M predicted values; and
obtain a predicted value of the current block based on a weighted summation of the M predicted values and the M weighting factors.

18. The coding apparatus of claim 17, wherein the processor is further configured to input the respective intra prediction modes or the respective texture distributions of the P reconstructed picture blocks into a trained neural network to obtain the Q priori candidate intra prediction modes and the Q probability values that are of the current block and that correspond to the Q priori candidate intra prediction modes.

19. The coding apparatus of claim 17, wherein the processor is further configured to: use, use, when the sum of the M probability values is 1, the probability value corresponding to the first priori candidate intra prediction mode as the weighting factor corresponding to the first priori candidate intra prediction mode.

20. A computer program product comprising computer-executable instructions that are stored on a non-transitory computer-readable storage medium and that, when executed by a processor, cause a coding apparatus to:

obtain respective intra prediction modes of P reconstructed picture blocks in a surrounding region of a current block or respective texture distributions of the P reconstructed picture blocks, wherein P is a first positive integer, wherein the surrounding region comprises a spatial neighborhood of the current block;
obtain, based on the respective intra prediction modes of the P reconstructed picture blocks or the respective texture distributions of the P reconstructed picture blocks, Q priori candidate intra prediction modes of the current block and Q probability values that are of the current block and that correspond to the Q priori candidate intra prediction modes wherein Q is a second positive integer;
obtain, based on M probability values corresponding to M priori candidate intra prediction modes, M weighting factors corresponding to the M priori candidate intra prediction modes, wherein obtaining the M weighting factors comprises performing, when a sum of the M probability values is not 1, normalization processing on the M probability values and using a normalized value of a probability value corresponding to a first priori candidate intra prediction mode as a weighting factor corresponding to the first priori candidate intra prediction mode, wherein the first priori candidate intra prediction mode is any one of the M priori candidate intra prediction modes, wherein M is a third positive integer, and wherein M is less than or equal to Q;
separately perform intra prediction based on the M priori candidate intra prediction modes to obtain M predicted values; and
obtain a predicted value of the current block based on a weighted summation of the M predicted values and the M weighting factors.

* * * * *

UNITED STATES PATENT AND TRADEMARK OFFICE
CERTIFICATE OF CORRECTION

PATENT NO. : 12,301,866 B2
APPLICATION NO. : 18/191367
DATED : May 13, 2025
INVENTOR(S) : Haitao Yang et al.

Page 1 of 1

It is certified that error appears in the above-identified patent and that said Letters Patent is hereby corrected as shown below:

In the Claims

Claim 19, Column 60, Line 20: "to: use, use, when" should read "to use, when"

Signed and Sealed this
Seventeenth Day of June, 2025

Coke Morgan Stewart
*Acting Director of the United States Patent and Trademark Office*